United States Patent
Den Doelder et al.

(10) Patent No.: US 10,815,321 B2
(45) Date of Patent: Oct. 27, 2020

(54) METHODS FOR PRODUCING LOW VOLATILE TUBULAR LOW DENSITY ETHYLENE-BASED POLYMERS FOR CLEAN EXTRUSION COATING PROCESSING

(71) Applicant: Dow Global Technologies LLC, Midland, MI (US)

(72) Inventors: Cornelis F J Den Doelder, Terneuzen (NL); Stefan Hinrichs, Terneuzen (NL); Eva-Maria Kupsch, Horgen (CH); Otto J. Berbee, Terneuzen (NL); Rajesh P. Paradkar, Freeport, TX (US); Bernard A. Fehr, Horgen (CH); Carmelo Declet Perez, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 78 days.

(21) Appl. No.: 16/095,412

(22) PCT Filed: Apr. 21, 2017

(86) PCT No.: PCT/US2017/028864
§ 371 (c)(1),
(2) Date: Oct. 22, 2018

(87) PCT Pub. No.: WO2017/184990
PCT Pub. Date: Oct. 26, 2017

(65) Prior Publication Data
US 2019/0135956 A1      May 9, 2019

Related U.S. Application Data

(60) Provisional application No. 62/326,511, filed on Apr. 22, 2016.

(51) Int. Cl.
| | | |
|---|---|---|
| *C08F 10/02* | (2006.01) | |
| *C08J 5/00* | (2006.01) | |
| *C09D 123/06* | (2006.01) | |
| *C08F 110/02* | (2006.01) | |

(52) U.S. Cl.
CPC ............... *C08F 110/02* (2013.01); *C08J 5/00* (2013.01); *C09D 123/06* (2013.01); *C08J 2323/06* (2013.01); *Y02P 20/582* (2015.11)

(58) Field of Classification Search
CPC .......... C08F 10/02; C08F 110/02; C08J 5/00; C09D 123/06
See application file for complete search history.

(56) References Cited

U.S. PATENT DOCUMENTS

| | | |
|---|---|---|
| 2,865,904 A | 12/1958 | Seed et al. |
| 3,299,033 A | 1/1967 | Douglas |

(Continued)

FOREIGN PATENT DOCUMENTS

| | | |
|---|---|---|
| EP | 0101875 A1 | 7/1983 |
| WO | 2011/008197 A1 | 1/2011 |
| WO | 2015/166297 A1 | 11/2015 |

*Primary Examiner* — Vu A Nguyen
(74) *Attorney, Agent, or Firm* — Quarles & Brady LLP

(57) ABSTRACT

A process for producing an ethylene-based polymer comprises polymerizing, by the presence of at least one free-radical initiator and using a high pressure tubular polymerization process, a reaction mixture containing ethylene and at least one CTA system comprising one or more CTA components to produce the ethylene-based polymer. The free-radical initiator is dissolved in a solvent comprising a saturated hydrocarbon to form an initiator solution which is added to the polymerization using an initiator feed line to an initiator injection pump. At least 50 wt % of the solvent has i) a dry point of less than or equal to 160° C. and ii) an initial boiling point of greater than or equal to 100° C. The polymerization process has a ratio of inlet pressure to first peak temperature of less than or equal to 9 Bar/° C. At least (Continued)

one CTA make-up stream is fed into the polymerization process, wherein less than or equal to 30 wt % of the at least one CTA make-up stream comprises one or more saturated hydrocarbon CTA(s) with a maximum carbon atom number of 6 per molecule.

15 Claims, 3 Drawing Sheets

(56) References Cited

U.S. PATENT DOCUMENTS

| | | | |
|---|---|---|---|
| 5,907,022 | A | 5/1999 | Stigter et al. |
| 7,737,229 | B2 * | 6/2010 | Gonioukh ............... C08F 10/00 |
| | | | 526/348.2 |
| 7,820,776 | B2 | 10/2010 | Neuteboom et al. |
| 8,278,393 | B2 | 10/2012 | Nummila-Pakarinen et al. |
| 9,238,700 | B2 | 1/2016 | Littmann et al. |
| 9,394,389 | B2 | 7/2016 | Berbee et al. |
| 9,828,496 | B2 | 11/2017 | den Doelder et al. |
| 10,017,589 | B2 | 7/2018 | Berbee et al. |
| 10,144,789 | B2 | 12/2018 | Nummila-Pakarinen et al. |
| 2006/0167193 | A1 | 7/2006 | Mahling et al. |
| 2007/0225445 | A1 | 9/2007 | Nguyen et al. |
| 2008/0242809 | A1 | 10/2008 | Neuteboom et al. |
| 2008/0261064 | A1 | 10/2008 | Laiho et al. |
| 2010/0087606 | A1 * | 4/2010 | Karjala ................. C08F 10/02 |
| | | | 526/64 |
| 2010/0093961 | A1 | 4/2010 | Aerts et al. |
| 2013/0333832 | A1 | 12/2013 | Vittorias et al. |
| 2015/0210785 | A1 | 7/2015 | Nummila-Pakarinen et al. |
| 2018/0112017 | A1 * | 4/2018 | Berbee ................. C08F 110/02 |

* cited by examiner

METHODS FOR PRODUCING LOW VOLATILE TUBULAR LOW DENSITY ETHYLENE-BASED POLYMERS FOR CLEAN EXTRUSION COATING PROCESSING

REFERENCE TO RELATED APPLICATIONS

The present application claims the benefit of U.S. Provisional Application 62/326,511, filed Apr. 22, 2016.

BACKGROUND

Standard solvents used for diluting and injecting initiators, such as, for example, organic peroxides, are typically in the range of from $C_{10}$ to $C_{14}$, such as, for example, isododecane, ISOPAR H (isoparaffin fluid available from Exxon Mobil), and SPIRDANE D-60 (available from Total). Due to their high boiling points, such $C_{10}$ to $C_{14}$ solvents accumulate to a low extent in the low density polyethylene (LDPE) manufacturing process by condensation in the compression section and removal through the produced product. Such solvents therefore do not interfere with the melt index (MI) control.

Despite the low accumulation, the high boiling point of these $C_{10}$ to $C_{14}$ solvents results in a high solvent level in the produced and shipped product. Furthermore, the high boiling point of these solvents makes additional solvent removal steps, such as, for example, devolatilization, vacuum devolatilization and/or pellet purging processes, less effective. Thus, during processing, such as high temperature extrusion coating, these residual volatiles cause potential higher volatile emission.

A further complicating factor is that tubular extrusion coating products require broad molecular weight distribution (MWD). Broad MWD is achieved with high temperatures and lower pressure conditions. High temperature/lower pressure conditions lead to high initiator and, consequently, high solvent demands. Further, low chain transfer agent (CTA) activity level, and therefore low solvent build-up, is required to maintain product MI control. The application of low boiling point solvents, such as, for example, n-heptane or iso-octane, leads to excessive build-up (less condensation in the compressing section) in the LDPE process and complicates MI control. Such low boiling point solvents are also not suitable, due to their low flashpoint (e.g., less than 5° C.), for transport of organic peroxides requiring dilution.

Thus, there remains a need for an improved process for manufacturing ethylene-based polymers, such as LDPE resins using an initiator solvent which results in low to moderate build-up, acceptable MI control, lower product volatiles and a reduced volatile organic compound (VOC) emission level during the extrusion process and low residual solvent level in extruded article of product application needing LDPE-based-products with a broad MWD.

There further remains a need for such an initiator solvent which further permits organic peroxide transportation. There further remains a need for such an initiator solvent which has a low aromatic content.

SUMMARY OF INVENTION

A process for producing an ethylene-based polymer comprises polymerizing a reaction mixture comprising ethylene and at least one CTA system comprising one or more CTA components, wherein the reaction mixture is polymerized by the presence of at least one free-radical initiator, using a high pressure, tubular polymerization process, to produce the ethylene-based polymer; wherein the free-radical initiator is dissolved in a solvent to form an initiator solution and the initiator solution is added to the polymerization using an initiator feed line to an initiator injection pump, wherein the solvent comprises a saturated hydrocarbon; wherein at least 50 wt % of solvent used in the initiator solution comprises the following properties: i) a dry point of less than, or equal to, 160° C., and ii) an initial boiling point of greater than, or equal to, 100° C.; wherein the polymerization process has a ratio of inlet pressure to first peak temperature of less than, or equal to, 9 Bar/° C.; wherein at least one CTA make-up stream is fed into the polymerization process; and wherein ≤30 wt % of the at least one CTA make-up stream comprises one or more saturated hydrocarbon CTA(s) with a maximum carbon atom number of 6 per molecule.

DETAILED DESCRIPTION

Figure 1:
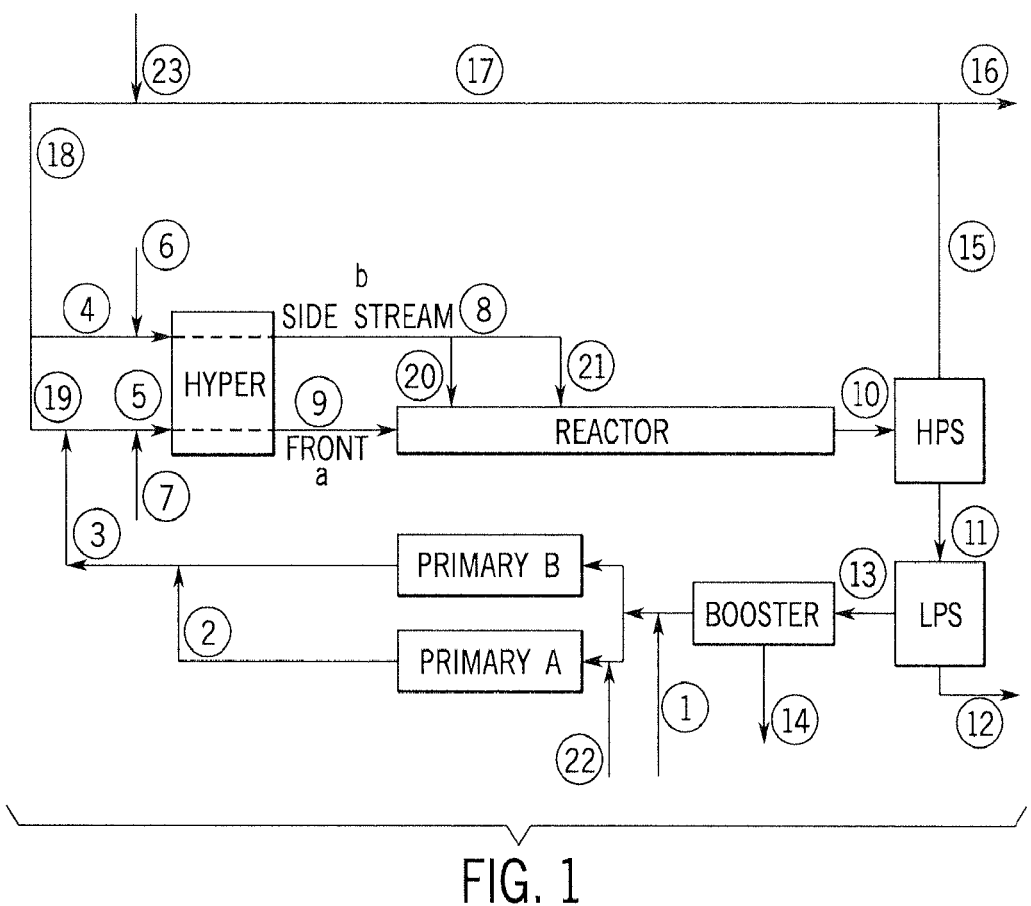
FIG. 1 is a flow scheme for the polymerization described in comparative example 1.

In a first aspect, the disclosures provides a process for producing an ethylene-based polymer comprises polymerizing a reaction mixture comprising ethylene and at least one CTA system comprising one or more CTA components, wherein the reaction mixture is polymerized by the presence of at least one free-radical initiator, using a high pressure, tubular polymerization process, to produce the ethylene-based polymer; wherein the free-radical initiator is dissolved in a solvent to form an initiator solution and the initiator solution is added to the polymerization using an initiator feed line to an initiator injection pump, wherein the solvent comprises a saturated hydrocarbon; wherein at least 50 wt % of solvent used in the initiator solution comprises the following properties: i) a dry point of less than, or equal to, 160° C., and ii) an initial boiling point of greater than, or equal to, 100° C.; wherein the polymerization process has a ratio of inlet pressure to first peak temperature of less than, or equal to, 9 Bar/° C.; wherein at least one CTA make-up stream is fed into the polymerization process; and wherein ≤30 wt % of the at least one CTA make-up stream comprises one or more saturated hydrocarbon CTA(s) with a maximum carbon atom number of 6 per molecule.

The process may comprise a combination of two or more embodiments described herein.

Ethylene and Comonomers

In one embodiment, the process comprises polymerizing a reaction mixture comprising ethylene. In an embodiment, the process comprises polymerizing a reaction mixture comprising ethylene and, optionally, one or more comonomers.

Optional comonomers which may be used in the reaction mixture include, but are not limited to, ethylenically unsaturated monomers and especially $C_{3-20}$ alpha-olefins, preferably $C_3$-$C_{10}$ α-olefins, carbon monoxide, vinyl acetate, and $C_{2-6}$ alkyl acrylates. More preferred α-olefins include propylene, 1-butene, 1-pentene, 1-hexene, 1-heptene and 1-octene; further propylene, 1-butene, 1-hexene and 1-octene, and further 1-butene, 1-hexene and 1-octene.

In one embodiment, an optional comonomer is selected from vinyl acetate, an alkyl acrylate, CO, acrylic acid, a carboxylic acid-containing comonomer, or a mono olefin, or selected from vinyl acetate, an alkyl acrylate, acrylic acid, and a mono olefin.

In one embodiment, the comonomers are capable of crosslinking polymer chains, for instance comonomers containing multiple unsaturations or containing an acetylenic functionality or comonomers with multiple functionality, like so-called monomeric CTAs. These type of comonomers are also called branching agents.

Chain Transfer Agent (CTA) System

In an embodiment, the process comprises polymerizing a reaction mixture comprising at least one CTA system. In an embodiment, the process comprising polymerizing a reaction mixture comprising at least one CTA system comprising one or more CTA components. In an embodiment, the process comprises polymerizing a reaction mixture comprising at least one CTA system comprising a mixture of two or more CTA components.

CTAs or telogens are used to control the melt index in a polymerization process. Chain transfer involves the termination of growing polymer chains, thus limiting the ultimate molecular weight of the polymer material. CTAs are typically hydrogen atom donors that will react with a growing polymer chain and stop the polymerization reaction of the chain.

CTAs can be of many different types and typically comprise at least one of the following groups: alkanes; alkenes; aldehydes such as formaldehyde or acetaldehyde; ketones such as acetone, diethyl ketone or diamyl ketone; saturated aliphatic aldehyde alcohols such as methanol, ethanol, propanol or butanol; ethers; esters; mercaptans or phosphines. By controlling the concentration of the selected CTA/CTA system, one can control the length of polymer chains, and, hence the molecular weight, for example, the number average molecular weight, Mn. The melt flow index (MFI or $I_2$) of a polymer, which is related to Mn, is controlled in the same way.

In an embodiment, the CTA system comprises at least one polar-based CTA.

A polar CTA is a CTA with a permanent dipole (i.e., the CTA has a positive end and a negative end). The electrons in a polar molecule are not equally shared among atoms of the molecule. Polar CTAs containing normally heteroatoms like O, N, S-atoms, for example aldehydes, ketones, amines or mercaptans.

In an embodiment, the CTA system comprises a mixture of two or more polar-based CTAs. In an embodiment, the CTA system is a polar-based CTA system. In an embodiment, a polar-based CTA system comprises one or more polar-based CTAs. In an embodiment, a polar-based CTA system comprises a mixture or two or more polar-based CTAs.

In an embodiment, polar-based CTAs used in the present process include, but are not limited to aldehyde-, ketone-, acetate-, ester- and alcohol-containing compounds. In an embodiment, the at least one polar-based CTA is selected from the group consisting of an aldehyde, a ketone, an acetate, an ester, and an alcohol. In an embodiment, the polar-based CTA system comprises a mixture of two or more polar-based CTAs, wherein each of the two or more polar-based CTAs is independently selected from the group consisting of an aldehyde, a ketone, an acetate, an ester, and an alcohol.

In an embodiment, the at least one polar-based CTA is selected from the group consisting of propionaldehyde, acetaldehydes, methyl ethyl ketone, acetone, methanol, ethanol, propanol, isopropanol, methylacetate, ethylacetate, vinylacetate and ethylacrylate.

In an embodiment, the polar-based CTA system comprises a mixture of two or more polar-based CTAs, wherein each of the two or more polar-based CTAs is independently selected from the group consisting of propionaldehyde, acetaldehydes, methyl ethyl ketone, acetone, methanol, ethanol, propanol, isopropanol, methylacetate, ethylacetate, vinylacetate, methylacrylate, ethylacrylate and butylacrylate.

In an embodiment, the CTA system comprises at least one nonpolar CTA. A nonpolar CTA is a CTA without a permanent dipole (i.e., the CTA does not have a positive end and a negative end). The electrons in a nonpolar molecule are essentially equally shared among atoms of the molecule. Nonpolar CTAs include, for example, saturated hydrocarbon CTAs.

In an embodiment, the CTA system comprises at least one alpha-olefin CTA. As used with reference to CTAs, "alpha-olefin" and like terms refer to a hydrocarbon molecule or a substituted hydrocarbon molecule (i.e., a hydrocarbon molecule comprising one or more atoms other than hydrogen and carbon, e.g., halogen, oxygen, nitrogen, etc.), the hydrocarbon molecule comprising (i) only one ethylenic unsaturation, this unsaturation located between the first and second carbon atoms, and (ii) at least 3 carbon atoms, preferably of 3 to 20 carbon atoms, in some cases preferably of 3 to 10 carbon atoms and in other cases preferably of 3 to 8 carbon atoms. Nonlimiting examples of $\alpha$-olefins from which the elastomers are prepared include propylene, 1-butene, 1-pentene, 1-hexene, 1-octene and mixtures of two or more of these monomers. In another embodiment, the CTA system is void of any alpha-olefin CTAs. In one embodiment, the CTA system is void of alpha-olefin CTAs including propylene and butene-1.

Alpha-olefinic CTAs, like propylene and butene-1, are known for their tendency to form stabilized allyl radicals. The formation of stabilized ally radicals will lower initiator efficiency and therefore increase the consumption of initiator dilution solvent, which consequently increases the residual solvent content in the product. The observation that the overall propagation rate is decreased as alpha-olefin concentration is increased is described by L. Boghettti et al in J. of Polymer Science. vol 61. pages 3-8 (1962). A CTA system may comprise a combination of two or more embodiments described herein.

Reaction Mixture

In an embodiment, the process comprises polymerizing a reaction mixture comprising ethylene and the at least one CTA system.

In an embodiment, the reaction mixture may include additional components, including, for example, and not limited to, branching agents.

In an embodiment, the reaction mixture is void of any branching agent.

In one embodiment the reaction includes non-ethylene components like methane, ethane, CTA, solvent, etc., and/or formed components, like peroxide dissociation products, such as, for example, tert-butanol, acetone and $CO_2$. Due to the low purge rate and their low conversions, these components will accumulate, and can drive the ethylene content below 97 wt %. The build-up of these impurities, found in recycled ethylene stream(s), will affect the polymerization process by lowering the ethylene concentration, and introducing components showing chain transfer activity.

Free-Radical Initiators

The process of the present invention is a free radical polymerization process. In an embodiment, the process comprises polymerizing a reaction mixture by the presence of at least one free-radical initiator. In an embodiment, the process comprises polymerizing a reaction mixture comprising ethylene and at least one CTA system in the presence of at least one free-radical initiator.

A free-radical initiator, as used herein, refers to a free radical generated by chemical and/or radiation means. In an embodiment, an initiator is selected from carboxylic peroxyesters, peroxyketals, dialkyl peroxides, and diacyl peroxides. Organic peroxide initiators are preferred, such as peresters, perketals, peroxy ketones, percarbonates and cyclic multifunctional peroxides. These organic peroxy initiators are used in conventional amounts, typically from 0.005 to 0.3 wt %, or from 0.01 to 0.2 wt %, or from 0.02 to 0.15 wt %, based on the weight of polymerizable monomers. Examples of organic peroxide initiators include, for example, dicumyl peroxide, di-tert-butyl peroxide, t-butyl perbenzoate, benzoyl peroxide, cumene hydroperoxide, t-butyl peroetoate, methyl ethyl ketone peroxide, 2,5-dimethyl-2,5-di(tert-butyl peroxy) hexane, lauryl peroxide, and tert-butyl peracetate, t-butyl alpha-cumyl peroxide, di-t-butyl peroxide, di-t-amyl peroxide, t-amyl peroxybenzoate, 1,1-bis(t-butylperoxy)-3,3,5-trim-ethylcyclohexane, alpha,alpha'-bis(t-butylperoxy)-1,3-diisopropyl-benzene. alpha,alpha'-bis(t-butylperoxy)-1,4-diisopropylbenzene, 2,5-bis(t-butylperoxy)-2,5-dimethyl-hexane, and 2,5-bis(t-butylperoxy)-2,5-dimethyl-3-hexyne. A suitable azo compound is azobisisobutyl nitrite.

Other suitable initiators include azodicarboxylic esters, azodicarboxylic dinitriles and 1,1,2,2-tetramethylethane derivatives, and other components capable of forming free radicals in the desired operating temperature range.

In an embodiment, the initiator comprises at least one peroxide group incorporated in a ring structure. Examples include: TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both from Akzo Nobel, and HMCH-4-AL (3,3,6,6,9,9-hexamethyl-1,2,4,5-tetroxonane) from United Initiators. See also Internat. Pubs. WO 02/14379 and WO 01/68723.

In one embodiment, an initiator is added to at least one reaction zone of the polymerization. In an embodiment, the at least one initiator may comprise a combination of two or more embodiments as described herein.

Solvent and Initiator Solution

In an embodiment, the process comprises polymerizing a reaction mixture by the presence of at least one free-radical initiator, wherein the free-radical initiator is dissolved in a solvent to form an initiator solution, and the initiator solution is added to the polymerization.

In an embodiment, the process comprises polymerizing a reaction mixture by the presence of at least one free-radical initiator, wherein the free-radical initiator is dissolved in a solvent to form an initiator solution, and the initiator solution is added to the polymerization using an initiator feed line to an initiator injection pump.

Typically, initiators are added into the polymerization process as diluted solutions in a solvent. A solvent may include a single compound or be a mixture of compounds. Solvent can originate from the peroxide manufacturing process, and/or additional sources required for transportation of the peroxide, and/or additional sources required for further dilution prior or during the peroxide injection into a polymerization process. In the embodiments described below, the solvent used as the carrier for the free-radical initiator is described as it is when used to add (e.g., inject) the free-radical initiator into the polymerization.

In an embodiment, the solvent comprises at least one saturated hydrocarbon. A saturated hydrocarbon is a compound composed of carbon and hydrogen with single bonds between the carbon atoms and without double and/or triple bonds between atoms of a radical group. Saturated hydrocarbons may be open-chains or cyclic. In an embodiment, the solvent comprises a mixture of two or more saturated hydrocarbons.

In an embodiment, the at least one saturated hydrocarbon has a boiling point $\geq 100°$ C.

In an embodiment, at least 50 wt %, or at least 55 wt %, or at least 60 wt %, or at least 65 wt % of the solvent used in the initiator solution comprises an initial boiling point $\geq 100°$ C., or $\geq 105°$ C., or $\geq 110°$ C., or $\geq 115°$ C., or $\geq 120°$ C., as measured in accordance with ASTM D86.

In an embodiment, at least 50 wt %, or at least 55 wt %, or at least 60 wt %, or at least 65 wt % of the solvent used in the initiator solution comprises a dry point $\leq 160°$ C., or $\leq 155°$ C., or $\leq 150°$ C., or $\leq 145°$ C., or $\leq 140°$ C., or $\leq 135°$ C., or $\leq 130°$ C., as measured with ASTM D86.

In an embodiment, at least 50 wt %, or at least 55 wt %, or at least 60 wt %, or at least 65 wt % of the solvent used in the initiator solution comprises an initial boiling point $\geq 100°$ C., or $> 105°$ C., or $\geq 110°$ C., or $\geq 115°$ C., or $\geq 120°$ C. and a dry point $\leq 160°$ C., or $\leq 155°$ C., or $\leq 150°$ C., or $\leq 145°$ C., or $\leq 140°$ C., or $\leq 135°$ C., or $\leq 130°$ C., as measured with ASTM D86.

In one embodiment the solvent used in the initiator solution has a boiling range from 100° C. to 160° C., or from 100° C. to 155° C., or from 105° C. to 155° C., or from 100° C. to 150° or from 105° C. to 150° C. C, or from 100° C. to 145° C., or from 105° C. to 145° C., or from 100° C. to 140° C., or from 105° C. to 140° C., or from 110° C. to 140° C. As used herein, the boiling range refers to a range of temperatures in which both the initial boiling point and dry point of the solvent lie.

In one embodiment, at least 50 wt %, or at least 55 wt %, or at least 60 wt %, or at least 65 wt % of the solvent used in the initiator solution has a boiling range of from 100° C. to 160° C., or from 100° C. to 155° C., or from 105° C. to 155° C., or from 100° C. to 150° or from 105° C. to 150° C. C, or from 100° C. to 145° C., or from 105° C. to 145° C., or from 100° C. to 140° C., or from 105° C. to 140° C., or from 110° C. to 140° C.

In an embodiment, at least 50 wt %, or at least 55 wt %, or at least 60 wt %, or at least 65 wt % of the solvent used in the initiator solution comprises an initial boiling point $\geq 100°$ C., or $> 105°$ C., or $\geq 110°$ C., or $\geq 115°$ C., or $\geq 120°$ C., a dry point $\leq 160°$ C., or $\leq 155°$ C., or $\leq 150°$ C., or $\leq 145°$ C., or $\leq 140°$ C., or $\leq 135°$ C., or $\leq 130°$ C., and a boiling range of from 100° C. to 160° C., or from 100° C. to 155° C., or from 105° C. to 155° C., or from 100° C. to 1500 or from 105° C. to 150° C. C, or from 100° C. to 145° C., or from 105° C. to 145° C., or from 100° C. to 140° C., or from 105° C. to 140° C., or from 110° C. to 140° C., wherein the initial boiling point and dry point are as measured in accordance with ASTM D86.

In an embodiment, at least 50 wt %, or at least 55 wt %, or at least 60 wt %, or at least 65 wt % of the solvent used in the initiator solution comprises a flashpoint $\geq 5°$ C. (ASTM D56).

Low boiling solvents or solvent components present in a solvent (system) will negatively affect and lower the flash point. A minimum flash point of 5° C. is required to make a solvent or solvent system suitable for transport of organic peroxides. Furthermore, a low boiling solvent or solvent components present in a solvent (system) will increase the solvent level in the high pressure free radical polymerization process. Typically, the reactor conversion level in a LDPE tubular reactor process varies between 20% and 40%. The unconverted ethylene together with other components, like CTA(s), process impurities, solvent, etc., is recycled through the high and low pressure recycle back to the hyper compressor, where it is compressed and fed to the reactor. The low pressure recycle is first compressed by the booster compressor. In the booster compressor, condensation of components will take place as a function of their boiling point and concentration level. The Booster outlet is compressed and fed together with an ethylene make-up stream with the help of the primary compressor to suction inlet of the hyper compressor. Mass balance calculations with the help of ASPEN PLUS of Aspen Technology, Inc., Burlington, Mass. USA show that the build-up level of solvent in the reactor inlet is strongly influenced by the boiling point of the solvent, for instance the following normalized solvent levels has been calculated for comparative and inventive solvents.

TABLE 1

| Boiling Point (° C.) | Normalized* Solvent Level | Boiling Point (° C.) | Normalized* Solvent Level |
| --- | --- | --- | --- |
| 75 | 380% | 150 | 70% |
| 100 | 170% | 175 | 50% |
| 125 | 100% | 200 | 40% |

*relative to the solvent at 125° C. which has a normalized accumulated solvent level of 100%

In an embodiment, the solvent used in the initiator solution comprises a majority weight percent of the saturated hydrocarbon or mixture of saturated hydrocarbons, based on the total weight of the solvent. In an embodiment, the solvent used in the initiator solution comprises ≥50 wt %, or ≥80 wt %, or ≥90 wt %, or ≥95 wt %, or ≥98 wt %, or ≥99 wt % saturated hydrocarbon, based on the total weight of the solvent.

In an embodiment, the solvent used in the initiator solution consists essentially of one or more saturated hydrocarbons. In an embodiment, the solvent used in the initiator solution consists essentially of a mixture of two or more saturated hydrocarbons.

In an embodiment, the solvent used in the initiator solution has an aromatic content of <300 ppm, or <200 ppm, or <150 ppm, or <100 ppm, based on the total weight of the solvent, as determined by UV.

In an embodiment, the solvent used in the initiator solution has a naphtene level <10 wt %, or <8 wt %, or <6 wt %, or <4 wt %, or <2 wt %, or <1 wt %, based on the total weight of the solvent, as determined by gas chromatography (GC) and/or mass spectroscopy.

As used herein, naphtenes are cyclic alkanes including, but not limited to, cyclohexane, decalin and alkyl-derivatives of these compounds. Naphtenes have a distinctive odor, typically described as gasoline-, kerosene- or aromatic-like. Due to the odor of napthenes, it is desirable to reduce and/or eliminate the amount of naphtene compounds in the solvent and/or resulting product.

In an embodiment, the solvent used in the initiator solution comprises n-paraffins and/or iso-paraffins. As used herein, the term "paraffin" is synonymous with alkane.

In an embodiment, the solvent used in the initiator solution has an n-paraffinic content ≥70 wt %, or ≥80 wt %, or ≥90 wt %, or ≥95 wt %, or ≥99 wt %, based on the total weight of the solvent and as determined by gas chromatography (GC) and/or mass spectroscopy. In an embodiment, n-paraffins are saturated straight chain hydrocarbons (alkanes).

In an embodiment, n-paraffins are typically described as having a gasoline-like odor. It may desirable, in some embodiments, to reduce the amount of n-paraffins (n-alkanes) present in the solvent used in the initiator solution.

In an embodiment, the solvent used in the initiator solution has an n-paraffin content ≤8 wt %, or ≤6 wt %, or ≤4 wt %, or ≤2 wt %, or ≤1 wt %, based on the total weight of the solvent and as determined by GC and/or mass spectroscopy.

In an embodiment, the solvent used in the initiator solution has an iso-paraffinic content ≥70 wt %, or ≥80 wt %, or ≥90 wt %, or ≥95 wt %, or ≥99 wt %, based on the total weight of the solvent and as determined by gas chromatography (GC) and/or mass spectroscopy. Iso-paraffins are typically described as being odorless.

In another embodiment, the solvent used in the initiator solution has an iso-paraffinic content ≤30 wt %, or ≤25 wt %, or ≤20 wt %, or ≤10 wt %, or ≤5 wt %, or ≤2 wt %, or ≤1 wt %, based on the total weight of the solvent, as determined by GC and/or mass spec.

In an embodiment, the solvent used in the initiator solution has an n-paraffin content ≥70 wt %, or ≥80 wt %, or ≥90 wt %, or ≥95 wt %, or ≥99 wt %, and an iso-paraffin content ≤30 wt %, or ≤25 wt %, or ≤20 wt %, or ≤10 wt %, or ≤5 wt %, or ≤2 wt %, or ≤1 wt %, based on the total weight of the solvent, as determined by GC and/or mass spectroscopy (mass spec.).

In an embodiment, the solvent used in the initiator solution has an iso-paraffin content ≥70 wt %, or ≥80 wt %, or ≥90 wt %, or ≥95 wt %, or ≥99 wt %, and an n-paraffin content ≤30 wt %, or ≤20 wt %, or ≤10 wt %, or ≤5 wt %, or ≤1 wt %, based on the total weight of the solvent, as determined by GC and/or mass spectroscopy (mass spec.).

In an embodiment, the solvent used in the initiator solution comprises a mixture of two or more saturated hydrocarbons with an aromatic content less than 300 wt-ppm, based on the total weight of the solvent. More preferably the naphtene content of the solvent used in the initiator solution is less than 8 wt %, based on the total weight of the solvent. Even more preferably the naphtene and n-alkane contents of the solvent used in the initiator solution are each less than 8 wt %, based on the total weight of the solvent.

In one embodiment the solvent used in the initiator solution has a boiling range of from 100° C. to 160° C., or from 100° C. to 155° C., or from 105° C. to 155° C., or from 100° C. to 150° or from 105° C. to 150° C. C, or from 100° C. to 145° C., or from 105° C. to 145° C., or from 100° C. to 140° C., or from 105° C. to 140° C., or from 110° C. to 140° C. Preferably, the solvent used in the initiator solution comprises a mixture of two or more saturated hydrocarbons with an aromatic content <300 wt-ppm, or <250 wt-ppm, or <200 wt-ppm, or <150 wt-ppm, or <100 wt-ppm, based on the total weight of the solvent. More preferably, naphtenic content of the solvent used in the initiator solution is <6 wt %, or <4 wt %, or <2 wt %, or <1 wt %, based on the total weight of the solvent. More preferably, the naphtenic and n-alkane contents of the solvent used in the initiator solution are each <6 wt %, or <4 wt %, or <2 wt %, or <1 wt %, based on the total weight of the solvent.

In one embodiment the solvent used in the initiator solution has a boiling range of from 100° C. to 160° C., or from 100° C. to 155° C., or from 105° C. to 155° C., or from 100° C. to 150° or from 105° C. to 150° C. C, or from 100° C. to 145° C., or from 105° C. to 145° C., or from 100° C. to 140° C., or from 105° C. to 140° C., or from 110° C. to 140° C. Preferably the solvent used in the initiator solution comprises a mixture of two or more saturated hydrocarbons with an aromatic content <300 wt-ppm, or <250 wt-ppm, or <200 wt-ppm, or <150 wt-ppm, or <100 wt-ppm, based on the total weight of the solvent. More preferably, the naphtene content of the solvent used in the initiator solution is <8 wt %, or <6 wt %, or <4 wt %, or <2 wt %, or <1 wt %, based on the total weight of the solvent, and the iso-paraffinic content is ≤30 wt %, or ≤25 wt %, or ≤20 wt %, or ≤10 wt %, or ≤5 wt %, or ≤1 wt %, based on the total weight of the solvent.

In an embodiment, the solvent used in the initiator solution is selected from the group consisting of ISOPAR E and n-octane. The properties of solvents used in an initiator solution as described herein are provided in Tables 2 and 3, below.

In an embodiment, the solvent comprises a combination of two or more embodiments described herein.

In an embodiment, the initiator solution comprises the at least one free-radical initiator and the solvent. In an embodiment, the average initiator concentration of the initiator solution is from 10 wt % to 50 wt %, or from 15 wt % to 45 wt %, or from 20 wt % to 40 wt %, based on the weight of the initiator solution.

TABLE 2

| Solvent | Supplier | Initial boiling point (° C.) ASTM D86 | Dry point (° C.) ASTM D86 | Flash point (° C.) ASTM D56 | Vapor pressure at 20° C. (kPA) |
| --- | --- | --- | --- | --- | --- |
| n-Hexane | Haltermann Carless | 68* | 70* | <−20* | 12.5 |
| n-Heptane | Haltermann Carless | 97* | 100* | <−4* | 3.9 |
| ISOPAR C | ExxonMobil | 98 | 104 | <0 | 5 |
| 2,2,4-trimethyl pentane | Haltermann Carless | 98* | 101* | −10* | 3.7 |
| ISOPAR E | ExxonMobil | 114 | 139 | 7 | 2 |
| n-Octane | Haltermann Carless | 124* | 127* | 12* | 1.3 |
| n-Decane | Haltermann Carless | 172* | 177* | 45* | 0.16 |
| Isododecane | Ineos | 176** | 192** | 45** | — |
| Isopar H | ExxonMobil | 180 | 188 | 54 | 0.07 |
| Spirdane D60 | Total | 187 | 219 | 67* | 0.04 |
| n-Undecane | Haltermann Carless | 193* | 198* | 67* | 0.04 |
| n-Dodecane | Haltermann Carless | 214* | 219* | 79* | 0.02 |
| n-Tridecane | Haltermann Carless | 233* | 238* | 95* | 0.01 |

*Equivalent method
**Estimated values
***Determined by vendor

TABLE 3

| Solvent | Supplier | Aromatic content* (wt-ppm**) | Isoparaffinic content* (wt %***) | n-paraffinic content* (wt %***) | Naphtenic content* (wt %***) | total aliphatic content* (wt %***) |
| --- | --- | --- | --- | --- | --- | --- |
| n-Hexane | Haltermann Carless | <100 | <5 | >95 | <5 | >99 |
| n-Heptane | Haltermann Carless | <200 | <5 | >95 | <5 | >99 |
| Isopar C | ExxonMobil | 10 | >99 | <1 | <1 | >99 |
| 2,2,4-trimethyl pentane | Haltermann Carless | <100 | <5 | >95 | <5 | >99 |
| Isopar E | ExxonMobil | 10 | >99 | <1 | <1 | >99 |
| n-Octane | Haltermann Carless | <100 | <5 | >95 | <5 | >99 |
| n-Decane | Haltermann Carless | <100 | <5 | >95 | <5 | >99 |
| Isododecane | Incos | <1 | >99 | <1 | <1 | >99 |
| Isopar H | ExxonMobil | 10 | >99 | <1 | <1 | >99 |
| Spirdane D60 | Total | <20 | <70 | <70 | >10 | >99 |
| n-Undecane | Haltermann Carless | <1000 | <5 | >95 | <5 | >99 |
| n-Dodecane | Haltermann Carless | <1000 | <5 | >95 | <5 | >99 |
| n-Tridecane | Haltermann Carless | <500 | <5 | >95 | <5 | >99 |

*Determined by vendor.
**Weight-ppm determined by UV and based on the total weight of the solvent.
***Weight percentages determined by gas chromatography and/or mass spectrometry, each based on the total weight of the solvent.

By applying pressure conditions below 1 bar in the separator and/or extrusion step, the amount of solvent removed can be optimized. In a vacuum devolatization step a, pressure below 1 bar is applied in a separator or during extruding the polymer. The following conditions are influencing the removal efficiency: vacuum condition, boiling point of the volatiles and molecular weight. For n-alkanes at constant vacuum conditions the removal efficiency is decreasing with increasing number of carbons as described in Ph.D, thesis, Department of Chemical Engineering at the University of Wales Swansea 1996, of Werner Schuler. In an embodiment, the initiator solution comprises a combination of two or more embodiments described herein.

Polymerizations

In an embodiment, the process comprises polymerizing a reaction mixture using a high pressure tubular polymerization process to produce an ethylene-based polymer.

In an embodiment, the polymerization process uses a jacketed tubular reactor which has one or more reaction zones. In an embodiment, the process takes place in a tubular reactor as described in international patent application PCT/US12/059469, filed Oct. 10, 2012.

In one embodiment, the polymerization takes place in two reactors, wherein in at least one of the reactors is a tubular reactor. In one embodiment, the polymerization takes place in one tubular reactor with multiple or at least two reaction zones.

In one embodiment, the polymerization takes place in a reactor configuration comprising at least two reaction zones, reaction zone 1 and reaction zone i (i≥2) and wherein reaction zone i is downstream from reaction zone 1. In an embodiment, i is from 2-5, or from 2-4. In an embodiment, i=2.

In one embodiment, the total number of reaction zones=i, wherein i is ≥2. In a further embodiment, i is from 2 to 20, further from 2 to 10, and further from 2 to 6.

The polymerization temperature in each tubular reactor zone of the process is typically from 100° C. to 400° C., more typically from 130° C. to 360° C., and even more typically from 140° C. to 330° C.

In one embodiment, the polymerization temperature in the first reaction zone is from 100 to 400, more typically from 130 to 360, and even more typically from 140 to 330° C.

In one embodiment, for the polymerization process described herein, the maximum (or peak) temperature for each reaction zone is from 150° C. to 360° C., or from 170° C. to 350° C., or from 200° C. to 340° C.

In one embodiment, for the polymerization process described herein, the maximum (or peak) temperature for the first reaction zone is from 150° C. to 360° C., or from 170° C. to 350° C., or from 200° C. to 340° C. In one embodiment, the peak temperature in the first reaction zone is at least >300° C., or at least >310° C., or at least >320° C. In one embodiment, the peak temperature in the first reaction zone is at least 10° C., or at least 20° C., or at least 30° C. greater than the peak temperature of each consecutive reaction zone.

In one embodiment, the peak temperature in the first reaction zone is at least 10° C., or at least 20° C., or at least 30° C. greater than the peak temperature of the last reaction zone.

In one embodiment, the peak temperatures in the first two reaction zones are at least 10° C., or at least 20° C., or at least 30° C. greater than the peak temperature of the last reaction zone.

In one embodiment, the polymerization takes place in at least one tubular reactor having at least three reaction zones, wherein the peak temperatures in the first two reaction zones are each at least 10° C. greater than the peak temperature of the last reaction zone.

In one embodiment, the polymerization pressure as measured at the first inlet of the reactor is from 1000 bar to 3600 bar, or from 1200 bar to 3500 bar, or from 1500 to 3400 bar, or from 2000 to 3200 bar.

In an embodiment, the ratio of the inlet pressure to the first peak temperature is ≤9 Bar/° C., or ≤8.75 Bar/° C., or ≤8.5 Bar/° C., or ≤8.25 Bar/° C., or ≤8.0 Bar/° C., or ≤7.75 Bar/° C., or ≤7.5 Bar/° C., or ≤7.25 Bar/° C.

In an embodiment, the process includes feeding at least one CTA make-up stream into the polymerization process. In an embodiment, the process includes feeding at least one CTA make-up stream into the polymerization process, wherein less than or equal to 30 wt %, or less than or equal to 25 wt %, or less than or equal to 20 wt %, or less than or equal to 15 wt % of the at least one CTA make-up stream comprises one or more saturated hydrocarbon CTA(s) with a maximum carbon number of six per molecule.

In an embodiment, the reactor conversion level of the process is at least 28%, or at least 29%, or at least 30%.

In an embodiment, the process comprises pelletizing the ethylene-based polymer to produce pellets. In one embodiment the pellet count is from 5 to 200/gram, or from 10 to 100/gram, or from 15 to 50/gram, or from 25 to 40/gram, or from 25 to 37/gram, or from 27 to 35/gram, or from 29 to 33/gram. In an embodiment, the pellets are in "ready to ship" or "ready for shipment" condition.

In an embodiment, the process comprises polymerizing a reaction mixture by the presence of at least one free-radical initiator to form an ethylene-based polymer, wherein the free-radical initiator is dissolved in a solvent comprising at least one saturated hydrocarbon to form an initiator solution, wherein the at least one saturated hydrocarbon has a boiling point ≥100° C., and pelletizing the ethylene-based polymer to form pellets.

In an embodiment, the process comprises isolating the ethylene-based polymer.

In an embodiment, the process comprises condensing and collecting a solvent-based stream comprising at least a portion of the solvent during the isolation of the ethylene-based polymer, wherein the solvent collected in the solvent-based stream is not recycled back to the polymerization process for reuse.

Condensed solvent from the booster compressor section will contain other components originating from lubrication and peroxide dissociation and other by-products, and the ketonic, aldehydic, and/or acetic compounds formed from these dissociation and other by-products contaminates the condensed solvent, which in turn contaminates the polymer product, resulting in odor issues in the polymer product.

In an embodiment, the process comprises separating the solvent from the ethylene-based polymer.

In an embodiment, the process comprises separating the solvent from the ethylene-based polymer using a high pressure separator and a low pressure separator.

In an embodiment, the high pressure separator is operated at a temperature range of from 230° C. to 280° C., or from 230° C. to 270° C., or from 230° C. to 260° C.

In an embodiment, the low pressure separator is operated at a pressure range of from 1.0 bar to 4.0 bar, or from 1.0 bar to 3.0 bar, or from 1.0 bar to 2.5 bar, or from 1.0 bar to 2.0 bar, or from 1.0 bar to 1.7 bar, or from 1.0 bar to 1.5 bar.

In an embodiment, the process comprises separating the solvent from the ethylene-based polymer using a high pressure separator and a lower pressure separator, wherein the high pressure separator is operated at a temp. range from 220° C. to 280° C., or from 220° C. to 270° C., or from 220° C. to 260° C. or from 230° C. to 260° C., and the low pressure separator is operated at a pressure range from 1.0 bar to 4.0 bar, or from 1.0 bar to 3.0 bar, or from 1.0 bar to 2.5 bar, or from 1.0 bar to 2.0 bar, or from 1.0 bar to 1.7 bar, or from 1.0 bar to 1.5 bar. In a further embodiment, the process comprises separating the solvent from the ethylene-based polymer using a high pressure separator and a lower pressure separator and extruding the ethylene-based polymer to form pellets.

In an embodiment, the process comprises separating the solvent from the ethylene-based polymer or otherwise isolating the ethylene-based polymer from at least the solvent and any unreacted ethylene using a low pressure separator. The low pressure separator is operated at a pressure range from 1.0 bar to 4.0 bar, or from 1.0 bar to 3.0 bar, or from 1.0 bar to 2.5 bar, or from 1.0 bar to 2.0 bar, or from 1.0 bar to 1.7 bar, or from 1.0 bar to 1.5 bar.

In an embodiment, the process comprises separating the solvent from the ethylene-based polymer using a high pressure separator and a lower pressure separator and extruding the ethylene-based polymer to form pellets.

In an embodiment, the process comprises separating the solvent from the ethylene-based polymer using one or more separators.

In an embodiment, the process comprises separating the solvent from the ethylene-based polymer using one or more separators and extruding the ethylene-based polymer to form pellets, wherein at least one of the one or more separators and the extrusion apply a pressure of less than 1.0 bar.

In an embodiment, the process comprises extruding the isolated ethylene-based polymer to form pellets of the isolated ethylene-based polymer.

In an embodiment, the process comprises separating at least a portion of the solvent from the ethylene-based polymer using at least one separator to form an ethylene-based polymer product, wherein the at least one separator is operated at a pressure range of less than 1.0 bar.

In an embodiment, the process comprises extruding the ethylene-based polymer product to form pellets. In an embodiment, the process comprises separating at least a portion of the solvent from the ethylene-based polymer using at least one separator, to form an ethylene-based polymer product, and extruding the ethylene-based polymer product to form pellets, wherein one or more of the separating and extruding steps applies a pressure <1.0 bar. In an embodiment, the separator is a low pressure separator.

In an embodiment, the process comprises a devolatilization step. In an embodiment, the devoltilization is vacuum devolatilization.

In one embodiment, the process does not use a branching agent.

A polymerization process may comprise combinations of two or more embodiments described herein.

Ethylene-Based Polymer

In an embodiment, the ethylene-based polymer is an ethylene-based polymer formed by the process described herein, or any combination of two or more embodiments of the process described herein. In one embodiment, the ethylene-based polymer comprises, in polymerized form, a majority amount of ethylene monomer and, optionally, at least one comonomer.

In one embodiment, the ethylene-based polymer is selected from a polyethylene homopolymer and an ethylene-based interpolymer. The term ethylene interpolymer as used in the present description, and the claims, refers to polymers of ethylene and one or more comonomers. Suitable comonomers to be used in the ethylene polymers of the present invention include, but are not limited to, ethylenically unsaturated monomers and especially $C_{3-20}$ alpha-olefins, preferably $C_3$-$C_{10}$ α-olefins, carbon monoxide, vinyl acetate, and $C_{2-6}$ alkyl acrylates. More preferred α-olefins include propylene, 1-butene, 1-pentene, 1-hexene, 1-heptene and 1-octene, further include propylene, 1-butene, 1-hexene and 1-octene.

In one embodiment, the ethylene-based polymer is a polyethylene homopolymer, for example a LDPE.

In one embodiment, the ethylene-based polymer is an ethylene-based interpolymer, or an ethylene-based copolymer.

In one embodiment, the ethylene-based polymer does not contain comonomers capable of crosslinking polymer chains, for instance comonomers containing multiple unsaturations or containing an acetylenic functionality.

In one embodiment, in the ethylene-based polymer is selected from a polyethylene homopolymer and an ethylene-based copolymer, wherein the comonomer of the ethylene-based copolymer is selected from vinyl acetate, an alkyl acrylate, CO, acrylic acid, a carboxylic acid-containing comonomer, or a mono olefin, or selected from vinyl acetate, an alkyl acrylate, acrylic acid, or a mono olefin.

In one embodiment, the ethylene-based interpolymer comprises ≥60 wt %, further ≥, 70 wt %, further ≥80 wt %, further ≥85 wt %, polymerized ethylene, based on the weight of the interpolymer. In a further embodiment, a comonomer is present in an amount from 0.5 to 10 wt %, based on weight of copolymer.

In one embodiment, the ethylene-based polymer has a density from 0.914 to 0.940, more typically from 0.916 to 0.930 and even more typically from 0.918 to 0.926, grams per cubic centimeter (g/cc or g/cm$^3$).

In one embodiment, the ethylene-based polymers have a MI ($I_2$) of from 0.5 to 15 g/10 min, or from 0.7 to 12 g/10 min, or from 1.0 to 10 g/10 min, or from 1.5 to 8 g/10 min.

In one embodiment, the ethylene-based polymers have a G' (at G" at 500 Pa, at 170° C.)>A+B*MI, wherein A=127 Pa and B=1.25 Pa/(dg/min).

In one embodiment, the ethylene-based polymers have a MI ($I_2$) of from 0.5 to 15 g/10 min, or from 0.7 to 12 g/10 min, or from 1.0 to 10 g/10 min, or from 1.5 to 8 g/10 min and a G' (at G" at 500 Pa, at 170° C.)>A+B*MI, wherein A=127 Pa and B=−1.25 Pa/(dg/min).

Ethylene-based polymers include LDPE homopolymer, and high pressure copolymers, including ethylene/vinyl acetate (EVA), ethylene ethyl acrylate (EEA), ethylene butyl acrylate (EBA), ethylene acrylic acid (EAA), and ethylene carbon monoxide (ECO). Other suitable comonomers are described in Ehrlich, P.; Mortimer, G. A.; Adv. Polymer Science; Fundamentals of Free-radical Polymerization of Ethylene; Vol. 7, pp. 386-448 (1970). In one embodiment, comonomers exclude comonomers capable of crosslinking polymer chains, for instance containing multiple unsaturations or an acetylenic functionality.

It is understood that trace amounts of impurities can be incorporated into the polymer structure; for example, low traces acetylenic components (less than 20 mol ppm in polymer) can be present in the ethylene feed according to typical specifications for ethylene (for example, acetylene at a maximum 5 mol ppm in the ethylene supply).

In an embodiment, the ethylene-based polymer in pellet form, ready for shipment, contains ≤[900 wt-ppm−(400 wt-ppm*A/B)] of residual solvent, or ≤[800 wt-ppm−(400 wt-ppm*A/B)] of residual solvent, or ≤[700 wt-ppm−(400 wt-ppm*A/B)] of residual solvent, or ≤[600 wt-ppm−(400 wt-ppm*A/B)] of residual solvent, wherein A=the amount of saturated hydrocarbons with a boiling point from 100° C. to 150° C. present in the initiator solution, and B=the amount of saturated hydrocarbons with a boiling point of greater than or equal to 100° C. present in the initiator solution. In a further embodiment, the ethylene-based polymer in pellet form, ready for shipment, has a MI (I$_2$) of from 0.5 to 15 g/10 min, or from 0.7 to 12 g/10 min, or from 1.0 to 10 g/10 min, or from 1.5 to 8 g/10 min, and a G' (at G" at 500 Pa, at 170° C.)>A+B*MI, wherein A=127 Pa and B=−1.25 Pa/(dg/min).

In an embodiment, the ethylene-based polymer in pellet form, ready for shipment, contains less ≤[500 wt-ppm−(300 wt-ppm*A/B)] of residual solvent, or ≤[450 wt-ppm−(300 wt-ppm*A/B)] of residual solvent, or ≤[400 wt-ppm−(300 wt-ppm*A/B)] of residual solvent, wherein A=the amount of saturated hydrocarbons with a boiling point from 100° C. to 150° C. present in the initiator solution, and B=the amount of saturated hydrocarbons with a boiling point ≥100° C. present in the initiator solution.

In an embodiment, the ethylene-based polymer in pellet form, ready for shipment, has a MI (I$_2$) from 0.5 to 15 g/10 min, or from 0.7 to 12 g/10 min, or from 1.0 to 10 g/10 min. or from 1.5 to 8 g/10 min. and a G' (at G" at 500 Pa, at 170° C.)>A+B*MI, wherein A=127 Pa and B=−1.25 Pa/(dg/min), and contains ≤[500 wt-ppm−(300 wt-ppm*A/B)] of residual solvent, or ≤[450 wt-ppm−(300 wt-ppm*A/B)] of residual solvent, or ≤[400 wt-ppm−(300 wt-ppm*A/B)] of residual solvent, wherein A=the amount of saturated hydrocarbons with a boiling point from 100° C. to 150° C. present in the initiator solution, and B=the amount of saturated hydrocarbons with a boiling point ≥100° C. present in the initiator solution.

In an embodiment, the solvent used in the initiator solution comprises at least one saturated hydrocarbon with a boiling point ≥100° C., and the ethylene-based polymer is pelletized into pellets, wherein the ethylene-based polymer in pellet form, ready for shipment, contains ≤[900 wt-ppm−(400 wt-ppm*A/B)] of residual solvent, or ≤[800 wt-ppm−(400 wt-ppm*A/B)] of residual solvent, or ≤[700 wt-ppm−(400 wt-ppm*A/B)] of residual solvent, or ≤[600 wt-ppm−(400 wt-ppm*A/B)] of residual solvent, wherein A=the amount of saturated hydrocarbons with a boiling point from 100° C. to 150° C. present in the initiator solution, and B=the amount of saturated hydrocarbons with a boiling point ≥100° C. present in the initiator solution. In a further embodiment, the ethylene-based polymer is pelletized into pellets, wherein the ethylene-based polymer in pellet form, ready for shipment, has a MI (I$_2$) of from 0.5 to 15 g/10 min, or from 0.7 to 12 g/10 min, or from 1.0 to 10 g/10 min. or from 1.5 to 8 g/10 min, and a G' (at G" at 500 Pa, at 170° C.)>A+B*MI, wherein A=127 Pa and B=−1.25 Pa/(dg/min).

In an embodiment, the solvent used in the initiator solution comprises at least one saturated hydrocarbon with a boiling point ≥100° C., and the ethylene-based polymer is pelletized into pellets, wherein the ethylene-based polymer in pellet form, ready for shipment, contains ≤[500 wt-ppm (300 wt-ppm*A/B)] of residual solvent, or ≤[450 wt-ppm−(300 wt-ppm*A/B)] of residual solvent, or ≤[400 wt-ppm−(300 wt-ppm*A/B)] of residual solvent, wherein A=the amount of saturated hydrocarbons with a boiling point from 100° C. to 150° C. present in the initiator solution, and B=the amount of saturated hydrocarbons with a boiling point ≥100° C. present in the initiator solution. In a further embodiment, the ethylene-based polymer in pellet form, ready for shipment, has a MI (I$_2$) of from 0.5 to 15 g/10 min, or from 0.7 to 12 g/10 min, or from 1.0 to 10 g/10 min, or from 1.5 to 8 g/10 min and a G' (at G" at 500 Pa, at 170° C.)>A+B*MI, wherein A=127 Pa and B=−1.25 Pa/(dg/min).

In an embodiment, the ethylene-based polymer in pellet form, ready for shipment, has a residual solvent level at least 30% lower than the residual solvent level of the ethylene-based polymer at the exit of the pelletizer used to form the pelletized polymer. In an embodiment, the ethylene-based polymer in pellet form, ready for shipment, has a residual solvent level at least 30% lower, or 32% lower, or 35% lower, or 38% lower, or 40% lower than the residual solvent level of the ethylene-based polymer at the exit of the pelletizer used to form the pelletized polymer.

An inventive ethylene-based polymer may comprise a combination of two or more embodiments as described herein.

Applications

The invention also provides a composition comprising an ethylene-based polymer formed using the inventive process.

In an embodiment, a composition comprising an ethylene-based polymer formed using the inventive process also includes at least one other ethylene-based polymer. In one embodiment, the at least one other ethylene-based polymer is selected from a polyethylene homopolymer and an ethylene-based interpolymer. The term ethylene interpolymer as used in the present description, and the claims, refers to polymers of ethylene and one or more comonomers. Suitable comonomers to be used in the ethylene polymers of the present invention include, but are not limited to, ethylenically unsaturated monomers and especially $C_{3-20}$ alpha-olefins, preferably $C_3$-$C_{10}$ α-olefins, carbon monoxide, vinyl acetate, and $C_{2-6}$ alkyl acrylates. More preferred α-olefins include propylene, 1-butene, 1-pentene, 1-hexene, 1-heptene and 1-octene, further include propylene, 1-butene, 1-hexene and 1-octene, and further 1-butene, 1-hexene and 1-octene. In one embodiment, the at least one other ethylene-based polymer is selected from (i) a polyethylene homopolymer having a density greater than or equal to 0.950 g/cc, (ii) an ethylene/alpha-olefin copolymer having a density less than or equal to 0.950 g/cc, wherein the alpha-olefin is a $C_3$-$C_{10}$ alpha-olefin, (iii) a high pressure ethylene-based polymer different in one or more properties (Mw, Mn, MWD, MI (I$_2$), density) from the ethylene-based polymer, and combinations thereof.

The invention also provides an article comprising at least one component formed using the inventive process. In one embodiment, the article is selected from a coated article, an injection molded article, a roto-molded article, a blow molded article, foam and combinations thereof. In one embodiment, the coated article is an extrusion coated article. In one embodiment, the article is a coated structure. In an embodiment, the coated structure comprises a coating comprising an ethylene-based polymer made using the inventive process. In an embodiment, the coated structure comprises a residual solvent content ≤200 ppm, based on the weight of the coating. In an embodiment, the article is an extrusion coated article comprising a substrate and an extruded coating formed from a composition comprising an ethylene-based polymer formed by an inventive process. In an embodiment, the extruded coating of the extrusion coated article has a weight ≥3 g/m$^2$, or ≥4 g/m$^2$, or ≥5 g/m$^2$, or ≥6 g/m$^2$.

In one embodiment, the extruded coating comprises ≤[400 wt-ppm−(200 wt-ppm*A/B)] residual solvent, or ≤[350 wt-ppm−(200 wt-ppm*A/B)] residual solvent, or ≤[300 wt-ppm (200 wt-ppm*A/B)] residual solvent, wherein A=the amount of saturated hydrocarbons with a boiling point from 100° C. to 150° C. present in the initiator solution, and B=the amount of saturated hydrocarbons with a boiling point ≥100° C. present in the initiator solution. In one embodiment, the extruded coating of the extrusion coated article has a weight ≤3 g/m², or ≥4 g/m², or ≥5 g/m², or ≥6 g/m², and the extruded coating comprises ≤[400 wt-ppm–(200 wt-ppm*A/B)] residual solvent, or ≤[350 wt-ppm–(200 wt-ppm*A/B)] residual solvent, or ≤[300 wt-ppm (200 wt-ppm*A/B)] residual solvent, wherein A=the amount of saturated hydrocarbons with a boiling point from 100° C. to 150° C. present in the initiator solution, and B=the amount of saturated hydrocarbons with a boiling point ≥100° C. present in the initiator solution. In one embodiment, the extruded coating comprises ≤[300 wt-ppm–(200 wt-ppm*A/B)] residual solvent, or ≤[280 wt-ppm–(200 wt-ppm*A/B)] residual solvent, or ≤[260 wt-ppm–(200 wt-ppm*A/B)] residual solvent, wherein A=the amount of saturated hydrocarbons with a boiling point from 100° C. to 150° C. present in the initiator solution, and 13 the amount of saturated hydrocarbons with a boiling point ≥100° C. present in the initiator solution.

In one embodiment, the extruded coating of the extrusion coated article has a weight ≥3 g/m², or >4 g/m², or >5 g/m², or ≥6 g/m², and the extruded coating comprises ≤[300 wt-ppm–(200 wt-ppm*A/B)] residual solvent, or ≤[280 wt-ppm–(200 wt-ppm*A/B)] residual solvent, or ≤[260 wt-ppm–(200 wt-ppm*A/B)] residual solvent, wherein A=the amount of saturated hydrocarbons with a boiling point from 100° C. to 150° C. present in the initiator solution, and B=the amount of saturated hydrocarbons with a boiling point ≥100° C. present in the initiator solution.

In one embodiment, the solvent used in the initiator solution comprises at least one saturated hydrocarbon with a boiling point ≥100° C., and the extruded coating comprises ≤[400 wt-ppm–(200 wt-ppm*A/B)] residual solvent, or ≤[350 wt-ppm–(200 wt-ppm*A/B)] residual solvent, or ≤[300 wt-ppm–(200 wt-ppm*A/B)] residual solvent, wherein A=the amount of saturated hydrocarbons with a boiling point from 100° C. to 150° C. present in the initiator solution, and B=the amount of saturated hydrocarbons with a boiling point ≥100° C. present in the initiator solution.

In one embodiment, the solvent used in the initiator solution comprises at least one saturated hydrocarbon with a boiling point ≥100° C., and the extruded coating of the extrusion coated article has a weight ≥3 g/m², or ≥4 g/m², or ≥5 g/m², or ≥6 g/m², and the extruded coating comprises ≤[400 wt-ppm–(200 wt-ppm*A/B)] residual solvent, or ≤[350 wt-ppm–(200 wt-ppm*A/B)] residual solvent, or ≤[300 wt-ppm–(200 wt-ppm*A/B)] residual solvent, wherein A=the amount of saturated hydrocarbons with a boiling point from 100° C. to 150° C. present in the initiator solution, and B=the amount of saturated hydro-carbons with a boiling point ≥100° C. present in the initiator solution.

In one embodiment, the solvent used in the initiator solution comprises at least one saturated hydrocarbon with a boiling point ≥100° C., and the extruded coating comprises ≤[300 wt-ppm–(200 wt-ppm*A/B)] residual solvent, or ≤[280 wt-ppm–(200 wt-ppm*A/B)] residual solvent, or ≤[260 wt-ppm–(200 wt-ppm*A/B)] residual solvent, wherein A=the amount of saturated hydrocarbons with a boiling point from 100° C. to 150° C. present in the initiator solution, and B=the amount of saturated hydrocarbons with a boiling point ≥100° C. present in the initiator solution.

In one embodiment, the solvent used in the initiator solution comprises at least one saturated hydrocarbon with a boiling point of ≥100° C., and the extruded coating of the extrusion coated article has a weight ≥3 g/m², or ≥4 g/m², or ≥5 g/m², or ≥6 g/m², and the extruded coating comprises ≤[300 wt-ppm–(200 wt-ppm*A/B)] residual solvent, or ≤[280 wt-ppm (200 wt-ppm*A/B)] residual solvent, or ≤[260 wt-ppm–(200 wt-ppm*A/B)] residual solvent, wherein A=the amount of saturated hydrocarbons with a boiling point from 100° C. to 150° C. present in the initiator solution, and B=the amount of saturated hydro-carbons with a boiling point ≥100° C. present in the initiator solution.

An inventive article may comprise a combination of two or more embodiments as described herein.

Definitions

Unless stated to the contrary, implicit from the context, or customary in the art, all parts and percents are based on weight, and all test methods are current as of the filing date of this disclosure.

The term "composition." as used herein, refers to a mixture of materials which comprise the composition, as well as reaction products and decomposition products formed from the materials of the composition.

The term "solution" refers to an essentially uniformally dispersed mixture of a substance which has been dissolved in a solvent.

The term "reaction mixture" refers to a mixture of one or more monomers and optionally other components, such as initiators, chain transfer agents and/or polymers, present or formed in the polymerization process.

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra. Trace amounts of impurities may be incorporated into and/or within a polymer. The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene, based on the weight of the polymer and, optionally, may comprise at least one comonomer.

The term "polyethylene homopolymer" refers to a polymer comprising units derived from ethylene and less than 0.5 wt % units derived from other comonomers and excludes the presence of branching agents.

The term "ethylene-based interpolymer" or "ethylene interpolymer" refers to an interpolymer that comprises a majority amount of polymerized ethylene, based on the weight of the interpolymer, and comprises at least one comonomer. The term "ethylene-based copolymer" or "ethylene copolymer" refers to an interpolymer that comprises a majority amount of polymerized ethylene, based on the weight of the copolymer, and only one comonomer (thus, only two monomer types).

The term "CTA system," as used herein, refers to the type and amount of one or more CTA(s) used in a polymerization process.

The term "CTA" or "chain transfer agent" refers, typically, to a hydrogen atom donor that will react with a growing polymer chain and stop the polymerization reaction of the chain and initiate a new growing polymer molecule.

The term "CTA component" refers, typically, to a CTA and other component in a CTA system.

The term "high pressure tubular polymerization process," as used herein, refers to a free radical polymerization process carried out in at least one tubular reactor at an elevated pressure of at least 1000 bar (100 MPa).

The term "solvent" refers to a substance or mixture of substances that is capable of dissolving another substance (i.e., a solute) to form an essentially uniformly dispersed mixture (i.e., solution). In regard to an initiator system, such as, for example, comprising a peroxide, the solvent can originate from the peroxide manufacturing process, and/or additional sources required for transportation of the peroxide, and/or additional sources required for peroxide injection into a polymerization process.

The term "saturated hydrocarbon" refers to a compound composed of carbon and hydrogen with single bonds between the carbon atoms and without double and/or triple bonds between carbon atoms.

The term "boiling point" of the substance is the temperature at which the vapor pressure of the liquid equals the atmospheric pressure.

The term "inlet pressure" or "reactor inlet pressure," as used herein, refers to the pressure level at the first inlet of the reactor configuration.

The term "reactor configuration," as used herein, refers to one or more reactors, and optionally one or more reactor pre-heaters, used to polymerize a polymer. Such reactors include, but are not limited to, autoclave reactor(s), tubular reactor(s), and combinations of autoclave and tubular reactors.

The term "first peak temperature" refers to maximum temperature of the first reaction zone.

A free-radical initiator, as used herein, refers to a free radical generated by chemical and/or radiation means.

The phrase "aromatic content in the solvent," and similar phrases, as used herein, refers to the total amount of aromatic groups in a solvent, typically determined by UV.

The phrase "naphtene-level in the solvent" and similar phrases, as used herein, refers to the total amount of naphtene in the solvent, as typically determined by gas chromatography and/or mass spectroscopy. As used herein, a "naphtene" is a cyclic alkane including, but not limited to, cyclohexane, decalin and alkyl-derivatives of these compounds.

The term "flashpoint" refers to the temperature at which a compound gives off sufficient vapor to ignite in air.

The term "iso-paraffinic content" refers to an amount of iso-paraffinic alkanes in a polymer or polymer product as determined by gas chromatography and/or mass spectroscopy.

The term "n-paraffinic content" refers to an amount of n-paraffinic alkanes in a polymer or polymer product as determined by gas chromatography and/or mass spectroscopy.

The term "make-up" (or "fresh") when used in reference to a component (i.e., "make-up (CTA" etc.) refers to the feed stream comprising the component needed to compensate for the converted and/or lost reactant in the polymerization process. The term "nonpolar CTA" refers to a CTA without a permanent dipole (i.e., the CTA does not have a positive end and a negative end). The electrons in a nonpolar molecule are essentially equally shared among atoms of the molecule.

The terms "injected initiator." "initiator injected." "injected initiator composition." and like terms, refer to free-radical initiator added into a polymerization process by injection, typically in the form of an initiator solution, and includes impurities which may be present in the initiator solution.

The term "high pressure separator" refers to a separator (or one or more separators) used to separate the mixture leaving the reactor into an ethylene-rich phase and polymer-rich phase and which operates at a pressure of from 20 bar to 600 bar.

The term "low pressure separator" refers to a separator (or one or more separators) used to separate the polymer-rich phase leaving the high pressure separator into an ethylene-rich phase and polymer-rich phase operating at a pressure of less than 20 bar.

The term "recycled," when used herein, in reference to a reactant (i.e., "recycled ethylene," "recycled CTA"), refers to unreacted reactant separated from the polymer in the high pressure separator(s) and/or the low pressure separator(s), and returned/compressed to the reactor.

The term "reactor conversion level" refers to ratio of weight of polymer produced to the total weight of reactor feed streams.

The term "iso-aliphatic hydrocarbon" refers to a non-aromatic, branched compound composed of carbon and hydrogen with single bonds between the carbon atoms and without double and/or triple bonds between atoms of a radical group.

The term "residual solvent content" refers to solvent remaining in pelletized polymer. The term "reactor configuration," as used herein, refers to the components (devices) used to polymerize and isolate a polymer. Such components/devices include, but are not limited to, one or more reactors, a Secondary compressor, a Primary compressor, and a Booster compressor.

The term "reaction zone." as used herein, refers to a reactor zone where polymerization reaction is initiated or reinitiated by the addition of free radicals and/or components which dissociate into and/or generate free radicals. Typically, the reaction medium is heated and/or cooled by a heat transfer medium flowing through the jacket around the reactor. A reaction zone may also start with the addition of fresh ethylene and/or free radicals or components which dissociate into and/or generate free radicals.

The term "first reaction zone." as used herein, refers to the first reactor zone where the polymerization is initiated by the addition of radicals or components which dissociate into and/or generate radicals. The first reaction zone ends at the point where there is a new feed of fresh and/or recycled ethylene, radicals, and/or components which dissociate into and/or generate radicals.

The term "injection point," as used herein, refers to the inlet location of a device (used in a polymerization process) where a feed stream is added to the device.

The terms "feed" or "feed stream," as used herein, refer to fresh and/or recycled component added to a reaction zone at an inlet. A feed may consist of CTA, or ethylene, or comprise CTA and/or ethylene.

The term "fresh." when used herein in reference to a product (e.g., "fresh ethylene-based polymer pellets," "fresh isolated ethylene-based polymer pellets," "fresh ethylene-based polymer product pellets"), refers to a product as obtained from an extruder, as opposed to a product ready for shipment. Fresh products (e.g., fresh pellets) are aged less than 24 hours at ambient conditions after their formation.

The term "ready for shipment" and like phrases refers to a polymer which has been processed or stored to have an ethylene level of less than or equal to 50 ppm, based on the weight of the polymer, in pellet form, typically as determined by headspace GC.

The term "substrate" refers to a surface onto which a coating is applied, for example, an extruded coating. Substrates may be any material, including, but not limited to, paper, metal, wood, or cardboard.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically listed.

Test Methods

Density: Samples for density measurement are prepared according to ASTM D 1928. Polymer samples are pressed at 190° C. and 30,000 psi for three minutes, and then at 21° C. and 207 MPa for one minute. Measurements are made within one hour of sample pressing using ASTM D792. Method B.

Melt Index: Melt index, or $I_2$, (grams/10 minutes or dg/min) is measured in accordance with ASTM 1) 1238, Condition 190° C./2.16 kg. $I_{10}$ is measured with ASTM D 1238, Condition 190° C./10 kg.

Initial Boiling Point: The initial boiling point is determined in accordance with ASTM D86. Dry Point: The dry point is determined in accordance with ASTM D86.

Aromatic Content: The aromatic content in ppm is determined by UV and based on the total weight of the solvent. Naphtene-Level: The naphtene level is in wt % is determined by gel chromatography and/or mass spectroscopy.

Flashpoint: The flash point is measured in accordance with ASTM D56 or, in certain conditions as described with reference to Table 1, ASTM D93.

Iso-Paraffinic Content: The iso-paraffinic content is in wt % is determined by gel chromatography and/or mass spectroscopy. n-Paraffinic Content: The n-paraffinic content is in wt % is determined by gel chromatography and/or mass spectroscopy.

Pellet Count: A weighing dish (from VWR Internat. or equivalent) is tarred on an analytical balance (from Mettler Toledo Inc. or equivalent). A scoopula (from VWR Internat. or equivalent) is used to weigh 2.00+/−0.10 gram of pellets into the dish. The weight W is measured in grams. Then the same pellets are spread on a flat surface, and the number of pellets N is counted. The pellet count CPG (count per gram) is calculated as CPG=N/W.

G'-method (at G" at 500 Pa, at 170° C.): The sample used in the G' measurement is prepared from a compression molding plaque. A piece of aluminum foil is placed on a back plate, and a template or mold is placed on top of the back plate. Approximately 12 grams of resin is placed in the mold, and a second piece of aluminum foil is placed over the resin and mold. A second back plate is then placed on top of the aluminum foil. The total ensemble is put into a compression molding press, which is run at the following conditions: 3 min at 150° C., at 10 bar pressure, followed by 1 min at 150° C., at 150 bar, followed by a "1.5 min" quench cooling to room temperature, at 150 bar. A 25 mm disk is stamped out of the compression-molded plaque. The thickness of this disk is approximately 2.0 mm.

The rheology measurement to determine G' is done in a nitrogen environment, at 170° C., and a strain of 10%. The stamped-out disk is placed between the two "25 mm" parallel plates located in an ARES-1 (Rheometrics SC) rheometer oven, which is preheated, for at least 30 minutes, at 170° C., and the gap of the "25 mm" parallel plates is slowly reduced to 1.65 mm. The sample is then allowed to remain for exactly 5 minutes at these conditions. The oven is then opened, the excess sample is carefully trimmed around the edge of the plates, and the oven is closed. The storage modulus and loss modulus of the sample are measured via a small amplitude, oscillatory shear, according to a decreasing frequency sweep from 100 to 0.1 rad/s (when able to obtain a G" value lower than 500 Pa at 0.1 rad/s), or from 100 to 0.01 rad/s. For each frequency sweep, 10 points (logarithmically spaced) per frequency decade are used.

The data is plotted (G' (Y-axis) versus G" (X-axis)) on a log-log scale. The Y-axis scale covers the range from 10 to 1000 Pa, while the X-axis scale covers the range from 100 to 1000 Pa. The Orchestrator software is used to select the data in the region where G" is between 200 and 800 Pa (or using at least 4 data points). The data are fit to a log polynomial model using the fit equation Y=C1+C2 ln(x). Using the Orchestrator software, G' at G" equal to 500 Pa is determined by interpolation.

Chain Transfer Activity: Chain transfer activity and comonomer reactivity scheme data are described in the following: P. Ehrlich. G. A. Mortimer, *Fundamentals of the free radical polymerization of ethylene*, Adv. Polymer Sci., Vol 7, 386-448 (1970); G. Mortimer, Journal of Polymer Science: Part A-1; *Chain transfer in ethylene polymerization*; Vol. 4, p 881-900 (1966); G. Mortimer, Journal of Polymer Science: Part A-1, *Chain transfer in ethylene polymerization. Part IV. Additional study at* 1360 atm and 130° C.; vol 8, p 1513-1523 (1970); G. Mortimer, Journal of Polymer Science: Part A-1, *Chain transfer in ethylene polymerization. Part V. The effect of temperature*; vol 8, p 1535-1542 (1970); G. Mortimer, Journal of Polymer Science: Part A-1, *Chain transfer in ethylene polymerization Part V. The effect of pressure*, vol 8, p 1543-1548 (1970); and G. Mortimer, Journal of Polymer Science: Part A-1, *Chain transfer in ethylene polymerization VII. Very reactive and depletable transfer agents*. vol 10, pp. 163-168 (1972).

TABLE A

Cs-Values as Measured by Mortimer at 130° C. and 1360 atm

| CTA | Cs | CTA | Cs | CTA | Cs | CTA | Cs |
|---|---|---|---|---|---|---|---|
| methane | 0.0000 | Cyclohexane | 0.0095 | n-butane | 0.005 | Acetone | 0.0168 |
| Tert-butanol | 0.0001 | Methylcyclohexane | 0.011 | 2,2,4trimethylpentane | | 0.0064 | Butene-1 | 0.047 |

TABLE A-continued

Cs-Values as Measured by Mortimer at 130° C. and 1360 atm

| CTA | Cs | CTA | Cs | CTA | Cs | CTA | Cs |
|---|---|---|---|---|---|---|---|
| ethane | 0.0006 | Propylene | 0.0122 | n-hexane | 0.0067 | MEK | 0.06 |
| Methanol | 0.0021 | n-decane | 0.0124 | Isobutane | 0.0072 | propionaldehyde | 0.33 |
| Propane | 0.00302 | n-tridecane | 0.0135 | n-heptane | 0.008 | | |
| Ethylacetate | 0.0045 | Isopropanol | 0.0144 | | | | |

Exhaust and Volume Stream Measurements: Measurements of the exhaust air speed are done with a Prandtlohr and micromanometer (BAFU Emission Measurement Recommendation, 2013 Chapter 3.1.3). The Exhaust air temperature is performed with a NicCr/Ni-thermocouple. The volume stream measurements are performed on a pipe having a diameter at the measuring point of 350 mm and an area of 1.159 m². The water content in the air is measured using a Firma Rotronic, Typ HygroPalm-HP22-A with electronic moisture sensor. All concentration data relate to dry gas under normal conditions (0° C., 1013 mbar). The results of the exhaust and volume steam measurements are provided in Table 4, below.

TABLE 4

| T (° C.) | b (mbar) | Δ p (mbar) | f* (kg/m³$_{n.tr}$) | v (m/s) | $V_b$ (m³/$h_b$) | $V_{n.f}$ (m³/$h_{n.f}$) | $V_{n.tr}$ (m³/$h_{n.tr}$) |
|---|---|---|---|---|---|---|---|
| 35 | 972 | −2.6 | 0.008 | 2.5 | 1500 | 1200 | 1200 ± 300 |

The T gas temperature in exhaust air stream.
b = external environmental pressure.
The Δ p = pressure difference in exhaust pipe.
f = moisture content normalized to (0° C. 1013 mbar) dry.
v = gas velocity.
The $v_b$ gas volume stream in under standard running conditions.
$v_{n.f}$ = gas volume stream normalized to normal (0° C. 1013 mbar) moist.
The $v_{n.tr}$ = gas volume stream normalized to normal (0° C., 1013 mbar) dry.

Sampling for GC/MS Fingerprint: The exhaust air is sucked with 0.5 l/min for 10 min through silicagel and active coal absorbent test tubes, which are connected in series. The tubes are closed gas tight, packed in aluminum foil and stored in the freezer at −20 C until the tubes are analyzed with a GC/MS analytical test method.

Gas sampling for the continuous measurement of total organic carbon: A Teflon probe is used, which is put into the exhaust pipe through the drilled sampling hole in the exhaust pipe as described before. A Teflon pipe that is heated on the total length to 180° C. is guiding the exhaust air to the flame ionization detector. The exhaust air is directly injected into the flame ionization detector (FID) for the quantitative measurement of organic carbon.

Measurement Method for Total Organic Carbon: The measurement of the organic carbon in the exhaust air is done according to the Swiss Federal Office for the Environment given for the measurements of air pollution at stationary plants (BAFU emission measurement recommendation, 2013 Chapter 7.2). The FID detector is from Fa. Kull, Type JUM VE-7, was calibrated with propane (C3H8). The results are reported as total carbon concentration (Org.C) in mg C/m³. Measuring rate is 0-100 ppm (control gas propane (C3H8) gave 8.9 ppm in synthetic air). The calibration for zero organic carbon was done with pure nitrogen.

Total Organic Emissions: The total organic emissions are measured with a flame ionization detector (FID). The FID measures the continuous total concentration of organic bound carbon in mg/m³. The gas sample is burned in a flame from hydrogen containing fuel gas and air. The conductivity of the flame is measured as flow of current through two electrodes under voltage. The signal is proportional to the amount of carbon atoms burned in the flame.

Experimental

MHE-GC

Multiple headspace extraction Gas Chromatography (MHE-GC) is applied to investigate volatile levels for LDPE samples. The MHE is here coupled to a GC apparatus to separate and quantify the volatiles in the sample. MHE conditions: The MHE was conducted with a Perkin Elmer Turbomatrix 16 instrument obtained from Perkin Elmer Instruments, Zaventem, Belgium. For the MHE the temperature of extraction was 205° C., with the needle and transfer line kept at 210° C. The extraction time was 45 minutes; while the injection, pressurization and withdrawal times were 0.06, 0.5 and 0.2 minutes respectively. The MHE experiments were conducted at single puncture mode with 3 extractions per sample. Helium gas, at 19.6 psi. was used as pressurization gas.

GC conditions: The GC separations were done in a Perkin Elmer Auto System XL GC instrument obtained from Perkin Elmer Instruments, Zaventem, Belgium. The separations were realized on a 30 m CP-Sil 8 CB column, part no. CP8771 obtained from Agilent technologies, with 0.25 mm internal diameter and stationary phase particle size of 1 micron. The injection port was kept at a temperature of 220° C. Helium at 14 psi was used as carrier gas with the split and vent set at 2 and 35-40 mL/min respectively. The oven temperature was in the beginning kept constant at 60° C. for 5 minutes, after which it was increased at a rate of 20° C./min, up to 250° C. and kept constant for 6 minutes. A Flame Ionization Detector (FID) was used for the analysis, set at a temperature of 250° C. The hydrogen and air flow rates set at 35 and 350 mL/min respectively. The resultant chromatograms were revaluated with ATLAS software package obtained from ThemoFischer Scientific, Netherlands.

Sample storage and preparation: The samples were prepared in 22 ml, vials, part no. B010426, and capped with PTFE/silicone liner spring & caps, part no 4000022, obtained from Perkin Elmer, Groningen, Netherlands. The sampling weight was 240-260 mg per vial. BHT (from Sigma Aldrich) or IRGANOX 1330 (from BASF) were used as additive with 10-15 mg added per vial. The choice of additive was dependent upon solvent type in the samples.

Calculation of residual solvent in samples: The MHE method is a dynamic gas extraction, carried out stepwise and establishing equilibration conditions in each extraction step. By mathematical extrapolation the total peak area proportional to the amount of the compound of interest in the original sample can be obtained. Minimum of 3 injections are required and the decreasing peak areas of these injections are used to calculate "the Total Peak Area" (TPA). The TPA can be calculated via the below formula:

$$TPA = \frac{A1}{1 - e^{-k}}.$$

where, A1=Peak are of first injection, and K=Slope of the MHE curve.

Using the above equation a linear correlation between the injection number and the ln of the area is constructed. This TPA is independent of the matrix. To calibrate the instrument with the above TPA, a solution containing approx. 1 gr of the solvent of interest is prepared in 25 ml methylene chloride. To obtain a reliable calibration line at least three different levels of solvents are analyzed; three volume amounts between 2 and 10 microliter (μL) are injected in a headspace vial and analyzed. Based on these data, a calibration line is drawn between TPA and the amount of solvent. The slope of this calibration curve (S) then gives the residual solvent level in samples "TPAU" by the following equation: Concentration residual solvent in samples $$(ppm) = \frac{TPAu}{S} \times 1/w,$$

where TPAu=Total Peak area of unknown sample; S=Slope of calibration curve (μgr/counts): and W=Intake weight (grams). The solvent of interest used for the calibration is the same as the solvent used in the process.

Table 5 below lists the solvents used in the examples and comparative examples. Tables 6 and 7 describe the reactors and reactor conditions of the examples and comparative examples. Table 8 describes the properties of the ethylene-based polymers produced.

TABLE 5

| Solvent | Initial boiling point (° C.) | Dry point (° C.) (ASTM D86) | Flash point (° C.) | Vapor pressure at 20° C. (kPA) | Aromatic content (wt-ppm) | Isoparaffinic content (wt %) | n-paraffinic content (wt %) | Naphtenic content (wt %) | total aliphatic content (wt %) |
|---|---|---|---|---|---|---|---|---|---|
| Exxsol n-Hexane | 66 | 69 | <0 | — | 10 | <1 | >99 | <1 | >99 |
| Exxsol n-Heptane | 94 | 98 | <0 | 5 | 10 | <1 | >99 | <1 | >99 |
| Isopar C | 98 | 104 | <0 | 5 | 10 | >99 | <1 | <1 | >99 |
| 2,2,4-trimethyl pentane | 99 | 99 | <0 | 5 | — | >99 | <1 | <1 | >99 |
| Isopar E | 114 | 139 | 7 | 2 | 10 | >99 | <1 | <1 | >99 |
| n-Octane | 125 | 126 | 13 | 1.5 | — | <1 | >99 | <1 | >99 |
| n-Decane | 174 | 174 | 46 | 0.2 | — | <1 | >99 | <1 | >99 |
| Isododecane | 176 | 192 | 45 | — | <1 | >99 | <1 | <1 | >99 |
| Isopar II | 180 | 188 | 54 | 0.07 | 10 | >99 | <1 | <1 | >99 |
| Spirdane D60 | 187 | 219 | 67 | 0.04 | <20 | <70 | <70 | >10 | >99 |

TABLE 6

Reactor conditions

| Ex. | MI (dg/min) | Throughput (t/h) | Reactor Conversion (wt %) | Inlet Pressure (bar) | Rx-zones (#) | Ethylene-feed distribution (wt %) | TP1 (° C.) | Inlet pressure/TP1 (bar/° C.) | Average TP (° C.) |
|---|---|---|---|---|---|---|---|---|---|
| CE1 | 4.1 | 56 | 31.9 | 2100 | 3 | 50/39/11 | 337 | 6.23 | 324 |
| IE1 | 3.9 | 45 | 30.1 | 2250 | 4 | 54/46/0/0 | 320 | 7.03 | 314 |
| CE2 | 2.03 | 45 | 27.7 | 2600 | 4 | 50/50/0/0 | 240 | 10.83 | 280 |
| CE3* | 4.9 | Not revealed | Not revealed | 2500 | Not revealed | Not revealed | 310 | 8.06 | 310 |
| CE4** | 5.3 | 27 | 34.5 | 2500 | 3 | 100/0/0 | 316 | 7.91 | 296 |

*prepared as described in WO2006094723 as Example 1
**prepared as described in WO2013178242 as Example B

TABLE 7

Other reactor and process conditions

| Ex. | CTA system | PA make-up (kg/h) | kg PA per t PE | Solvent type | Solvent usage (kg/h) | kg solvent per t PE | LPS pressure (bar) | HPS pressure (bar) | HPS temperature polymer (° C.) |
|---|---|---|---|---|---|---|---|---|---|
| CE1 | PA only | 11.9 | 0.67 | Spirdane D60 | 35.5 | 1.99 | 1.53 | 225 | 248 |

TABLE 7-continued

Other reactor and process conditions

| Ex. | CTA system | PA make-up (kg/h) | kg PA per t PE | Solvent type | Solvent usage (kg/h) | kg solvent per t PE | LPS pressure (bar) | HPS pressure (bar) | HPS temperature polymer (° C.) |
|---|---|---|---|---|---|---|---|---|---|
| IE1 | PA only | 10.7 | 0.79 | Isopar E | 38.4 | 2.83 | 1.5 | 206 | 242 |
| CE2 | PA only | 45.4 | 3.64 | Isopar E | 22.2 | 1.78 | 1.5 | 213 | 240 |

TABLE 8

Product properties

| Ex. | MI (dg/min) | G' (Pa) | G' claim boundary (Pa) | Pellet Count (#/gram) | Residual solvent in polymer at sample table (wt-ppm*) | Residual solvent in polymer ready for shipment (wt-ppm*) |
|---|---|---|---|---|---|---|
| CE1 | 4.1 | 137 | 121.9 | 31 | | 1000 ± 100 |
| IE1 | 3.9 | 140 | 122.1 | 31 | 400 ± 40 | ≤3 $10^2$ |
| CE2 | 2.03 | 89 | 124.5 | 31 | 275 ± 25 | ≤2 $10^2$ |
| CE5 - Sabic NexCoat 5 | 4.9 | 149 | 120.9 | NA | NA | NA |
| CE6 - Borealis CT7200 | 5.3 | 128 | 120.4 | NA | NA | NA |

*Wt-ppm based on weight polymer samples (pellets); pellet count per gram.
NA = not available Description of Flow Diagram Used for Comparative Example CE1

FIG. 1 shows the flow scheme of the high pressure polymerization process with a tubular reactor, used to produce Comparative CE1. Stream (1), fresh ethylene make-up, is compressed together with the outlet of the Booster by Primary compressor system resulting in flow (3). Stream (3) is combined with high pressure recycle stream (19) and fed through line (5) to the Hyper compressor part feeding the front (9) of the Reactor. The Hyper compressor part feeding the side stream (8) receives ethylene feed through line (4). The ethylene supplied by line (8) is distributed through line (20) and (21) to the side of the reactor. Line (4) receives ethylene feed from line (18). The CTA is fed through line (22). Stream (2) combines with stream (3). The Hyper pressurizes the ethylene feed streams to a level sufficient to feed the high pressure tubular reactor (Reactor). Stream (6) and/or stream (7) depict the CTA feed. Information about the Reactor system can be found in the further text. In the Reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated in the HPS and transferred at stream (11) to the LPS and is further processed in (12). The ethylene removed (13) in the LPS is fed to the Booster, where, during the compression, condensables such as solvent, lubrication oil and others are collected and removed through stream (14). The outlet of the Booster is combined with make-up ethylene stream (1), and further compressed by the Primary compressors. This process flow scheme has been used for the polymerization of CE1. Process conditions can be found in Tables 6 and 7. The initiators used at each initiator injection point comprise TRIGONOX 301, di-t-butyl peroxide, and/or t-butyl peroxy-2-hexanoate.

Description of Flow Diagram Used for Inventive Example 1 and Comparative Example 2

Figure 2:
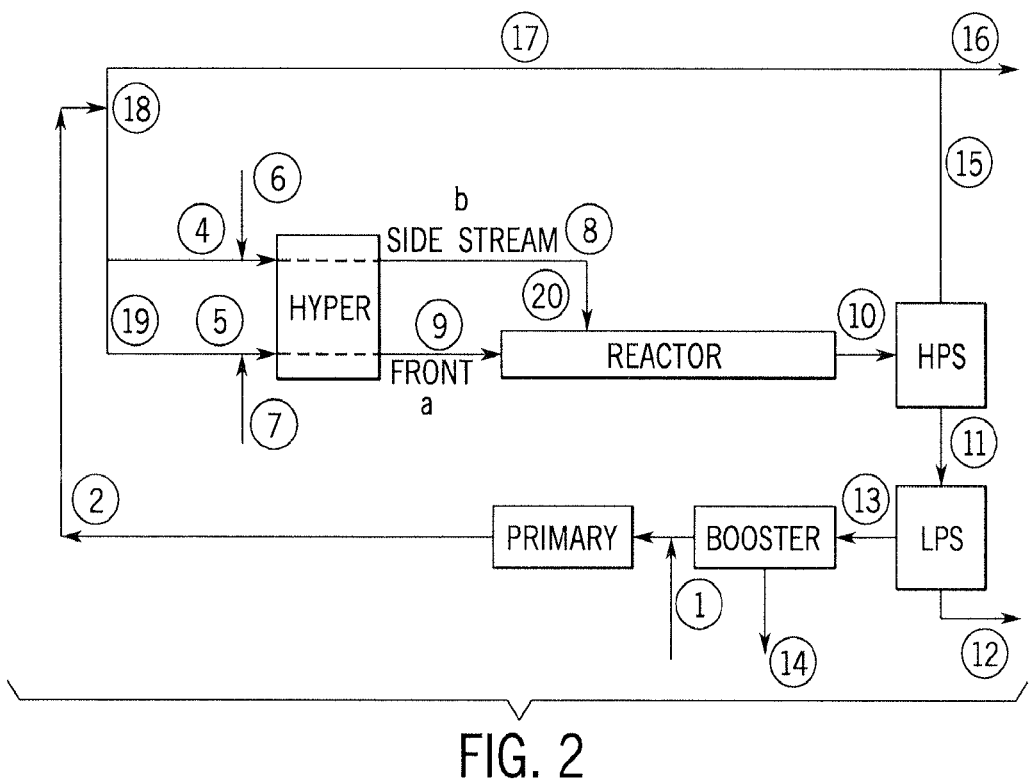
FIG. 2 is a flow scheme for the polymerization described in inventive example 1 and comparative example 2.

FIG. 2 shows the flow scheme of the high pressure polymerization process with a tubular reactor, used to produce Inventive Example 1 and Comparative Example 2. Stream (1), fresh ethylene make-up, is compressed together with the outlet of the Booster by Primary compressor system resulting in flows (2). Stream (2) are combined with the high pressure recycle stream (18) and fed through line (19) and (5) to the Hyper compressor part feeding the front (9) of the Reactor. The Hyper compressor part feeding the side stream (8) receives ethylene feed through line (4). The ethylene supplied by line (8) is distributed through line (20) to the side of the reactor. Line (4) receives ethylene feed from line (18). The Hyper pressurizes the ethylene feed streams to a level sufficient to feed the high pressure tubular reactor (Reactor). Stream (6) and/or stream (7) depict the CTA feed. Information about the Reactor system can be found in text below. In the Reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated as discussed above for FIG. 1. This process flow scheme has been used for the polymerization of IE1. Process conditions can be found in Tables 6 and 7.

The initiators used at each initiator injection point comprise t-butyl peroxy pivalate, di-t-butyl peroxide, t-butyl peroxy acetate and/or t-butyl peroxy-2-hexanoate.

Extrusion Coating Line Description

Extrusions to form an extrusion coated article were conducted on an ER-WE-PA, Maschinenfabrik Erkrath Nr. 7237 extrusion coating line having a year of construction of 1990, with a flat, wide slit die (0.8 m wide), equipped with an extruder that has an output of up to 350 kg/h of polymer. The molten polymer exits the die with a temperature of 260-340° C., the air gap is 250 mm and the nip-off set 10 mm. The molten polymer is coated to form an extruded coating on a KRAFT paper substrate, and cooled by the chill roll having a temperature of 15° C. The exhaust vapors are collected on both sides of the flat die and guided into the central exhaust pipe.

Location of the Sampling/Measurement Points

Six holes of (2× diameter 6.5 mm, 1× diameter 15 mm, 1× diameter 10 mm and 1× diameter 5 mm) are drilled into the horizontal main exhaust pipe (diameter 45 mm) located before the ventilator. The two holes with a diameter of 6.5 mm are used for taking the sample with the Silicagel and active coal test tubes, which are connected in series, with an extraction rate of 0.5 l/min. The temperature of the extruded material for all trials is 320° C. The KRAFT paper substrate coated is 60 g/m². For each material, four trials are performed. The line speed of the extrusion coating line and the coating weight are varied for each of the four trials according to Table 9, below.

TABLE 9

| Material | Line Speed (m/min) | Coating Weight (g/m²) | Org. C*** (mgC/m³) | Org. C*** (g/hr) | Temp (° C.) |
|---|---|---|---|---|---|
| CE1 | 300 | 25 | 78 | 96 | |
| IE1 | 300 | 25 | 34 | 47 | 33 |
| IE1 | 100 | 75 | 27 | 37 | 32 |
| CE6 - Borealis CT 7200* | 300 | 25 | 74 | 103 | 32 |
| CE5 - Sabic NexCoat5** | 300 | 25 | 43 | 61 | 32 |

*Isododecane used as solvent for the peroxide dilution solvent, as determined by GC profile.
**Normal alkane mixture (for example. NORPAR) used as solvent for the peroxide dilution solvent, as determined by GC profile.
***The standard deviation for VOC measurements is ±20.

Table 10 summarizes the properties of the polymers used in the extrusion coating at different stages in the extrusion coating process.

conditions of below 1.0 bar in the separation and/or extrusion steps. The purpose that this product was added to this extrusion coating study was to develop a baseline for the contribution to VOC measurement of the smoke particles formed during the high temperature extrusion coating process. The VOC measurement is the sum of the contribution from the residual solvent in the starting polymer and the smoke particles formed in the extrusion coating process. By the applied pressure conditions and the long purge/shelf-lifetime of the material CE3 has an extreme low residual solvent level and most of the measured VOC originates from the smoke formed during the extrusion coating process. It has been assumed that all extrusion coatings performed at 300 m/min, at 320° C. and at a polymer output of 325 kg/h generate the same smoke level and have therefore the same contribution in grams per hour to the measured VOC-level. The data in Table 10 of CE7 and IE1 has been used to calculate the contribution of smoke level to VOC level and furthermore to derive an equation between residual solvent level in polymer to be extruded and contribution of overall VOC-level. The contribution of smoke to VOC-level of 23 g/h has been used to analyze the VOC-data of CE1, Sabic NexCoat 5 (CE5) and Borealis CT 7200 (CE6) in respect to g/h of solvent removed (see tables 11 and 12). For Borealis CT7200 (CE6) two rows are given in Table 11. In the first row the % solvent removed is assumed similar to CE1. In the other row the % solvent removed is increased from 22.5% to 27% to credit the higher volatility of the used solvent.

Figure 3:
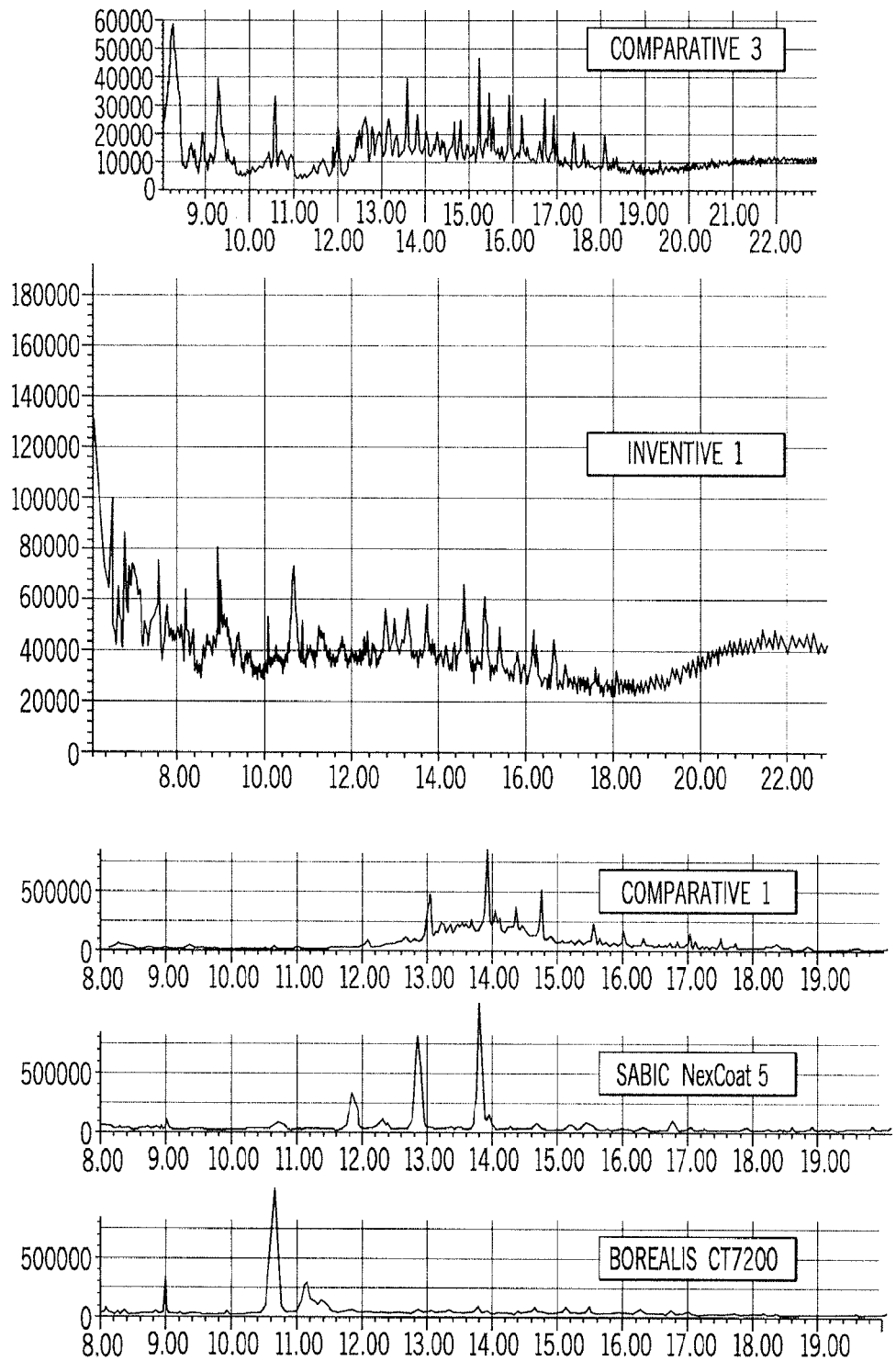
FIG. 3 includes GC-diagrams of analyzed VOC of inventive example 1, comparative examples 1 and 3. Sabic NexCoat 5 (CE5) and Borealis CT17200 (CE6).
Figure 4:
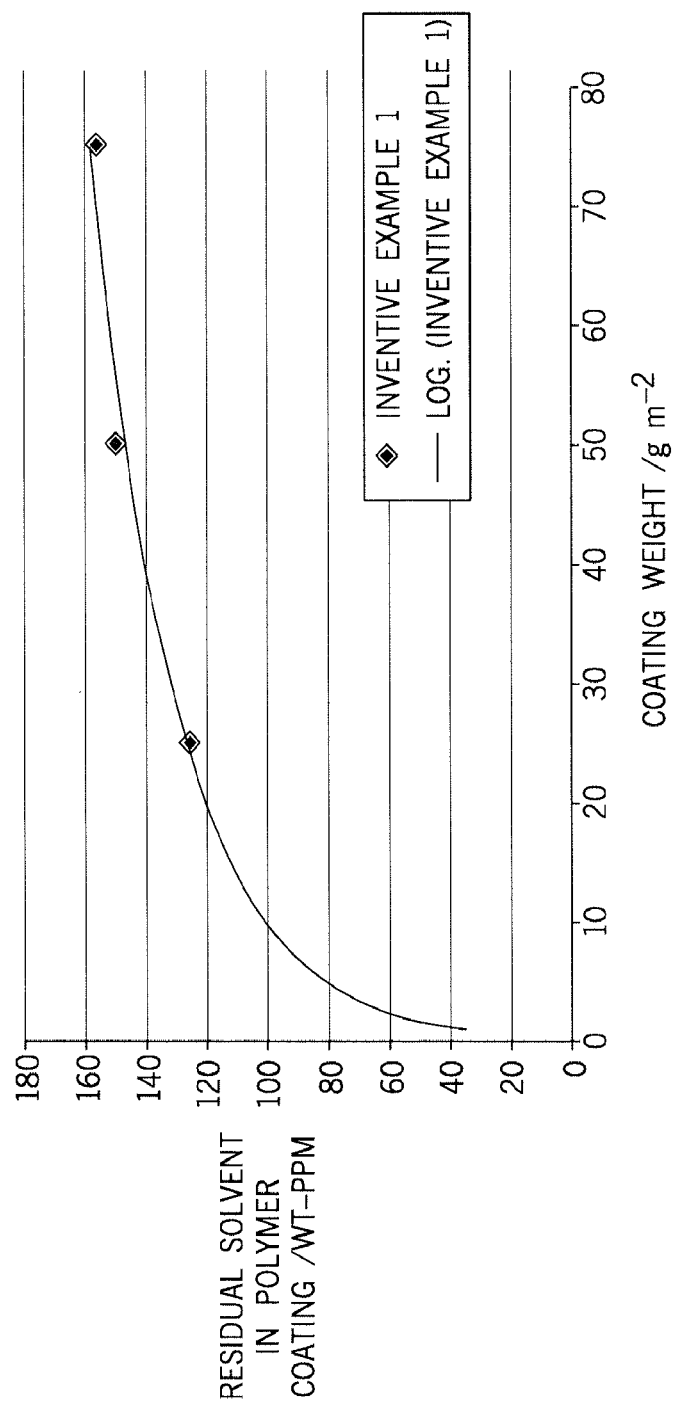
FIG. 4 illustrates the relationship of residual solvent in polymer coating/wt-ppm as a function of coating weight for inventive example 1.

FIG. 3 shows GC diagrams of analyzed VOC contents of comparative example, Sabic NexCoat 5 (CE5) and Borealis CT7200 (CE6). CE1 contains Spirdane D60 as residual initiator dilution solvent. Spirdane D60 is a multi-component solvent and its components contribute in 12 to 15 min retention time range.

Sabic NexCoat 5 (CE5) contains a mixture of n-$C_{10}$ to n-$C_{14}$ as residual initiator dilution solvent (see three distinct peaks between 11 and 14 min retention time).

Borealis CT7200 (CE6) contains isododecane as residual initiator dilution solvent, which is to a large extent a mono-component solvent (see large peak at 10 to 11 min retention time).

TABLE 10

Solvent levels of extruded coated polymer

| Ex. | Solvent type | Solvent level in polymer from sample table (wt-ppm) | Solvent level in polymer ready to ship (wt-ppm) | Estimated Solvent level in polymer at coating line (wt-ppm) | VOC measured (g/h) | Smoke contribution (g/h) | Solvent emitted (g/h) |
|---|---|---|---|---|---|---|---|
| CE1 | Spirdane D60 | >1100 | >1000 | 1000 ± 100 | 96 | 23 | 73 |
| CE7 | ISOPAR E | 100 | 75 | 50 ± 25 | 29 | 23 | 6.0 |
| IE1 | ISOPAR E | 400 | 300 | 200 ± 100 | 47 | 23 | 24 |

CE7 is an extrusion coating product made in an autoclave reaction system. The product has been exposed to pressure

TABLE 11

| Ex. | Polymer output (kg/h) | line speed (m/min) | residual volatiles prior coating (wt-ppm) | solvent present in polymer (g/h) | VOC measured (g/h) | Coating weight (g/m²) | Smoke (g/h) | Solvent removed (g/h) | Solvent removed (%) | Solvent present in polymer coating (g/h) | Solvent present in polymer coating (wt-ppm) |
|---|---|---|---|---|---|---|---|---|---|---|---|
| CE1 | 325 | 300 | 1000 | 325 | 96 | 25 | 23 | 73 | 22.5 | 252 | 775 |
| IE1 | 325 | 300 | 200 | 65 | 47 | 25 | 23 | 24 | 36.9 | 41 | 126 |
| | 325 | 150 | 200 | 65 | 39 | 50 | 23 | 16 | 24.6 | 49 | 151 |
| | 325 | 100 | 200 | 65 | 37 | 75 | 23 | 14 | 21.5 | 51 | 157 |

TABLE 11-continued

| Ex. | Polymer output (kg/h) | line speed (m/min) | residual volatiles prior coating (wt-ppm) | solvent present in polymer (g/h) | VOC measured (g/h) | Coating weight (g/m²) | Smoke (g/h) | Solvent removed (g/h) | Solvent removed (%) | Solvent present in polymer coating (g/h) | Solvent present in polymer coating (wt-ppm) |
|---|---|---|---|---|---|---|---|---|---|---|---|
| CE6 - Borealis CT7200 | 325 | 300 | 1096 | 356 | 103 | 25 | 23 | 80 | 22.5 | 276 | 850 |
| CE6 - Borealis CT7200 | 325 | 300 | 913 | 297 | 103 | 25 | 23 | 80 | 27.0 | 217 | 667 |
| CE5 - Sabic NexCoat 5 | 325 | 300 | 521 | 169 | 61 | 25 | 23 | 38 | 22.5* | 131 | 404 |

*% solvent removed is assumed similar to CE1 due to the similarity of the used solvent.

TABLE 12

| Ex. | Polymer output (kg/h) | line speed (m/min) | residual volatiles prior coating (wt-ppm) | solvent present in polymer (g/h) | VOC measured (g/h) | web thickness (g/m²) | Smoke (g/h) | solvent removed (g/h) | Solvent removed (%) | Solvent present in polymer coating (g/h) | Solvent present in polymer coating (wt-ppm) |
|---|---|---|---|---|---|---|---|---|---|---|---|
| CE1 | 325 | 300 | 1000 | 325 | 96 | 25 | 23 | 73.0 | 22.5 | 252 | 775 |
| 50% CE1 + 50% IE1 | 325 | 300 | 600 | 195 | 71.5 | 25 | 23 | 48.5 | 24.9 | 147 | 451 |
| 25% CE1 + 75% IE1 | 325 | 300 | 400 | 130 | 59.25 | 25 | 23 | 36.25 | 27.9 | 94 | 288 |
| IE1 | 325 | 300 | 200 | 65 | 47 | 25 | 23 | 24.0 | 36.9 | 41 | 126 |

The invention claimed is:

1. A process for producing an ethylene-based polymer, said process comprising:
   polymerizing a reaction mixture comprising ethylene and at least one CTA system comprising one or more CTA components;
   wherein the reaction mixture is polymerized by the presence of at least one free-radical initiator, using a high pressure, tubular polymerization process, to produce the ethylene-based polymer;
   wherein the free-radical initiator is dissolved in a solvent to form an initiator solution and the initiator solution is added to the polymerization using an initiator feed line to an initiator injection pump, wherein the solvent comprises a saturated hydrocarbon;
   wherein at least 50 wt % of solvent used in the initiator solution comprises the following properties: i) a dry point of less than, or equal to, 160° C., and ii) an initial boiling point of greater than, or equal to, 100° C.;
   wherein the polymerization process has a ratio of inlet pressure to first peak temperature of less than, or equal to, 7.5 Bar/° C.;
   wherein at least one CTA make-up stream is fed into the polymerization process; and
   wherein ≤30 wt % of the at least one CTA make-up stream comprises one or more saturated hydrocarbon CTA(s) with a maximum carbon atom number of 6 per molecule.

2. The process of claim 1, wherein at least one CTA component is a polar CTA.

3. The process of claim 1, wherein the solvent used in the initiator solution comprises at least one saturated hydrocarbon with a boiling point 100° C.; and wherein the ethylene-based polymer is pelletized to produce pellets, and wherein the polymer in pellet, in a form ready for shipment, contains ≤[900 wt-ppm (400 wt-ppm * A/B)] of residual solvent;
   wherein A=the amount of saturated hydrocarbons, each with a boiling point from 100° C. to 160° C., present in the initiator solution; wherein B=the amount of saturated hydrocarbons, each with a boiling point ≥100° C., present in the initiator solution.

4. The process of claim 1, wherein said solvent further has an aromatic content of less than 300 ppm, based on the total weight of the solvent.

5. The process of claim 1, wherein the solvent further has a naphtene-level of less than 10 wt % based on the total weight of the solvent.

6. The process of claim 1, wherein the solvent used in the initiator solution has an iso-paraffin content ≥70 wt %, and an n-paraffin content ≤30 wt %, based on the total weight of the solvent, as determined by GC and/or mass spectroscopy (mass spec.).

7. The process of claim 1, wherein the polymerization takes place in at least one tubular reactor comprising at least two reaction zones, and wherein the peak temperature in the first reaction zone is at least 10° C. greater than the peak temperature of the last reaction zone.

8. The process of claim 1, wherein the polymerization takes place in at least one tubular reactor comprising at least three reaction zones, and wherein the peak temperatures in the first two reaction zones are each at least 10° C. greater than the peak temperature of the last reaction zone.

9. The process of claim 1, wherein the process further comprises isolating the ethylene-based polymer, from at least unreacted ethylene and solvent, using a low pressure separator, and wherein the low pressure separator is operated at a pressure range from 1.0 bar to 4.0 bar.

10. The process of claim 1, wherein the process further comprises separating the solvent from the ethylene-based polymer using one or more separators, and extruding the ethylene-based polymer to form pellets, wherein at least one of the one or more separators, and/or the extrusion operate at a pressure of less than 1.0 bar.

11. The process of claim 1, further comprising extruding the ethylene-based polymer onto a substrate to form a coating having a coating weight greater than or equal to 3 g/m$^2$.

12. The process of claim 1, further comprising extruding the ethylene-based polymer onto a substrate to form a coating having a coating weight greater than or equal to 6 g/m$^2$.

13. The process of claim 1, further comprising extruding the ethylene-based polymer onto a substrate to form a coating having a coating weight from 25 g/m$^2$ to 75 g/m$^2$.

14. The process of claim 1, further comprising extruding the ethylene-based polymer onto a substrate to form a coating having a residual solvent content of less than or equal to 200 ppm and a coating weight greater than or equal to 3 g/m$^2$.

15. The process of claim 1, wherein the solvent used in the initiator solution has a boiling range from 100° C. to 160° C.

* * * * *